United States Patent
Hwang et al.

(10) Patent No.: US 11,423,895 B2
(45) Date of Patent: Aug. 23, 2022

(54) METHOD AND SYSTEM FOR PROVIDING AN INTERACTIVE INTERFACE

(71) Applicant: SAMSUNG ELECTRONICS CO., LTD., Suwon-si (KR)

(72) Inventors: Inchul Hwang, Suwon-si (KR); Hyeonmok Ko, Suwon-si (KR); Munjo Kim, Suwon-si (KR); Hyungtak Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 16/758,570

(22) PCT Filed: Sep. 25, 2019

(86) PCT No.: PCT/KR2019/012440
§ 371 (c)(1),
(2) Date: Apr. 23, 2020

(87) PCT Pub. No.: WO2020/067710
PCT Pub. Date: Apr. 2, 2020

(65) Prior Publication Data
US 2020/0349938 A1    Nov. 5, 2020

(30) Foreign Application Priority Data

Sep. 27, 2018 (KR) .................... 10-2018-0115346

(51) Int. Cl.
*G10L 15/22* (2006.01)
*G06F 3/14* (2006.01)
(Continued)

(52) U.S. Cl.
CPC ................ *G10L 15/22* (2013.01); *G06F 3/14* (2013.01); *G06F 3/167* (2013.01); *G06N 3/08* (2013.01);
(Continued)

(58) Field of Classification Search
CPC ....... G10L 15/22; G10L 15/063; G10L 25/63; G10L 15/16; G10L 2015/223;
(Continued)

(56) References Cited

U.S. PATENT DOCUMENTS 5,918,222 A    6/1999   Fukui et al.
9,336,268 B1 *  5/2016   Moudy ............. G06F 16/24578
(Continued)

FOREIGN PATENT DOCUMENTS

AU    2013231030 A1 *  4/2014   ........ H04M 1/72454
BR    PI1011670 A2 *  9/2015   ............. G06F 3/041
(Continued)

OTHER PUBLICATIONS

International Search Report dated Jan. 3, 2020 in counterpart International Patent Application No. PCT/KR2019/012440.
(Continued)

*Primary Examiner* — Mohammad K Islam
(74) *Attorney, Agent, or Firm* — Nixon & Vanderhye, PC.

(57) ABSTRACT

Provided are a method and device for providing an event-emotion-based interactive interface by using an artificial intelligence (AI) system. The method includes identifying an emotional state of a user for at least one event by analyzing a response to a query, learning emotion information of the user for the at least one event, based on the emotional state of the user, determining an interaction type for the at least one event, based on the emotion information of the user, and providing notification information for the at least one event, based on the interaction type.

16 Claims, 19 Drawing Sheets

(51) Int. Cl.
    *G06F 3/16*     (2006.01)
    *G06N 3/08*     (2006.01)
    *G10L 15/06*     (2013.01)
    *G10L 25/63*     (2013.01)
    *G10L 15/16*     (2006.01)

(52) U.S. Cl.
    CPC ............ *G10L 15/063* (2013.01); *G10L 25/63* (2013.01); *G10L 15/16* (2013.01); *G10L 2015/223* (2013.01); *G10L 2015/225* (2013.01)

(58) Field of Classification Search
    CPC ..... G10L 2015/225; G06F 3/14; G06F 3/167; G06N 3/08
    See application file for complete search history.

(56) References Cited

U.S. PATENT DOCUMENTS

| | | | |
|---|---|---|---|
| 9,786,299 | B2 | 10/2017 | Un et al. |
| 2008/0096533 | A1 | 4/2008 | Manfredi et al. |
| 2016/0163332 | A1* | 6/2016 | Un .................... G06F 16/90332 704/260 |
| 2016/0180722 | A1 | 6/2016 | Yehezkel et al. |
| 2018/0150739 | A1* | 5/2018 | Wu ......................... G06N 20/10 |
| 2018/0174020 | A1* | 6/2018 | Wu .......................... G06N 3/08 |
| 2018/0322403 | A1* | 11/2018 | Ron ........................ H04L 51/02 |
| 2019/0012591 | A1* | 1/2019 | Limsopatham ....... G06N 3/0427 |
| 2020/0007380 | A1* | 1/2020 | Chen ..................... H04L 41/046 |
| 2021/0125610 | A1* | 4/2021 | Cheung .................. G06N 20/00 |

FOREIGN PATENT DOCUMENTS

| | | | | |
|---|---|---|---|---|
| CN | 105931638 | A * | 9/2016 | ............. G10L 15/22 |
| CN | 108039988 | A * | 5/2018 | ........... G06K 9/6256 |
| DE | 202017105815 | U1 * | 12/2017 | ......... G10L 15/1815 |
| JP | 09-081632 | | 3/1997 | |
| JP | 2005-062240 | | 3/2005 | |
| KR | 10-2014-0126485 | | 10/2014 | |
| KR | 10-2017-0092603 | | 8/2017 | |
| WO | 2016/089929 | | 6/2016 | |

OTHER PUBLICATIONS

Written Opinion dated Jan. 3, 2020 in counterpart International Patent Application No. PCT/KR2019/012440.

Extended Search Report dated Feb. 3, 2021 in counterpart European Patent Application No. 19864979.0.

* cited by examiner

FIG. 3

| DATA COLLECTED FROM WEB/DATA CREATED BY EXPERT | ANALYZED/EXTRACTED EMOTION INFORMATION |
|---|---|
| Dear school, we're not machines. | ashamed |
| Skipped school today skipping school tomorrow haha | happy |
| RT @RelatableQuote:This school year is coming to an end 😢 htt://t.co/LjM3T5Vjr9 | sad |
| Photoset: aarontvelts: "what do you do?" "I'm a teacher" "Really? So is my brother! What school?" "It's uh a… http://t.co/IL8Olzm7Oj | angry |
| I went to school for maybe not even an hour & then left idk | angry |
| Old School Subprime Slowly Returns: A mortgage lender operating from California is providing home loan financi… http://t.co/cLatzliGU7 | angry |
| @smittydoes currently watching School of Rock, so no you're not alone | angry |
| @taramrich @dez_norris@rwilliams629 @tmcotney @spiazza505 @bryna_lamb I don't know what you're talking about I love school and Mondays | angry |
| Kenwood Jigh School Varsity Lacrosse Travis Manion Foundation night. Truly inspiring. "If Not Me, Then Who…" http://t.co/IfpqTNqLF1 | sad |
| RT @xSmiley_Guwopp: Yea I'm gone really Need Some ice cream After School. | sad |
| "@RoI_Lex: @shan_chrme_rain I'm hungry and stuck at school☺FedEx me some food please☺" <<< Istill owe u dinner in EP!! Lol | angry |
| I sweaaa i neva did like school boys behh | ashamed |

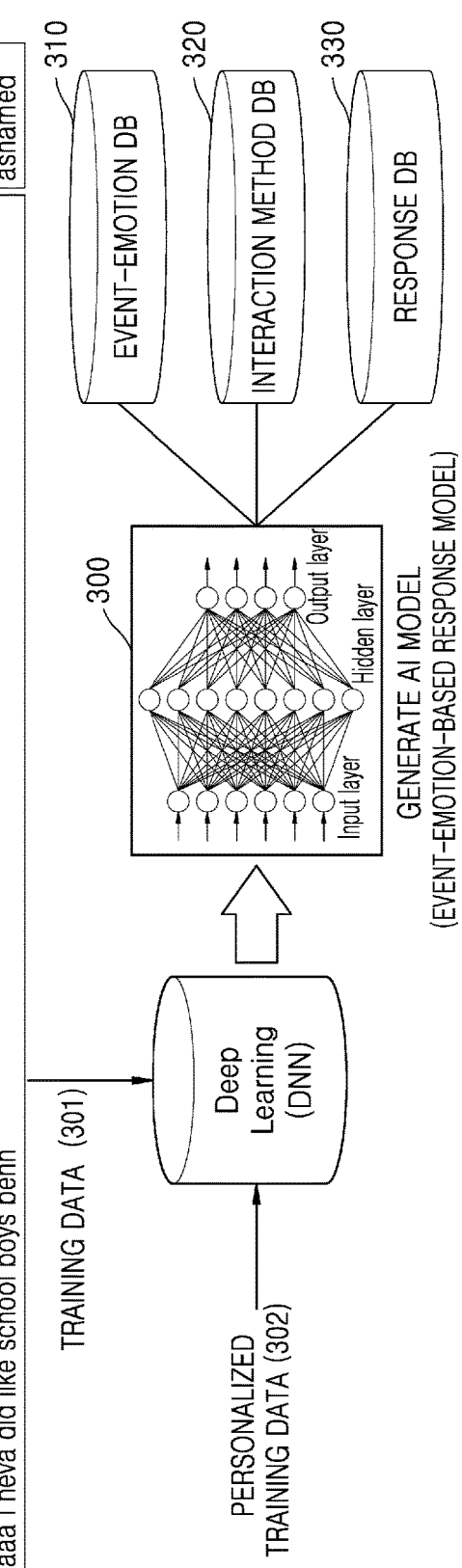

TRAINING DATA (301) → Deep Learning (DNN) → GENERATE AI MODEL 300 (EVENT-EMOTION-BASED RESPONSE MODEL)

PERSONALIZED TRAINING DATA (302)

310 EVENT-EMOTION DB
320 INTERACTION METHOD DB
330 RESPONSE DB

FIG. 9

| EVENT (900) | REMARKS | | EMOTION INFORMATION | | |
|---|---|---|---|---|---|
| PRESENTATION (910) | DEFAULT | | NERVOUSNESS(0.4) | JOY(0.6) | |
| | PERSON | CEO | NERVOUSNESS(0.9) | JOY(0.1) | |
| | | FRIEND | NERVOUSNESS(0.1) | JOY(0.9) | |
| | PLACE | CONFERENCE ROOM | NERVOUSNESS(0.4) | JOY(0.4) | AFRAIDNESS(0.2) |
| | | OUTING | NERVOUSNESS(0.1) | JOY(0.9) | |
| FRIEND'S WEDDING (920) | DEFAULT | | NERVOUSNESS(0.2) | JOY(0.8) | |
| | TIME | MORNING | NERVOUSNESS(0.3) | JOY(0.6) | AFRAIDNESS(0.1) |
| | | AFTERNOON | NERVOUSNESS(0.2) | JOY(0.8) | |
| | | EVENING | NERVOUSNESS(0.1) | JOY(0.9) | |
| | PLACE | OUTDOORS | NERVOUSNESS(0) | JOY(1) | |
| | | INDOORS | NERVOUSNESS(0.2) | JOY(0.8) | |

FIG. 14

| Tone \ Emotion | fear | anger | sorrow | joy | disgust | surprise |
|---|---|---|---|---|---|---|
| speech rate | much faster | slightly faster | slightly slower | faster or slower | very much slower | much faster |
| pitch average | very much higher | very much higher | slightly lower | much higher | very much lower | much higher |
| pitch range | much faster | much wider | slightly narrower | much wider | slightly wider | |
| intensity | normal | higher | lower | higher | lower | higher |
| voice quality | irregular voicing | breathy chest tone | resonant | breathy blaring | grumbled chest tone | |
| pitch changes | normal | abrupt on stressed syllable | downward inflections | smooth upward inflections | wide downward terminal inflections | rising contour |
| articulation | precise | tense | slurring | normal | normal | |

1410

METHOD AND SYSTEM FOR PROVIDING AN INTERACTIVE INTERFACE

This application is the U.S. national phase of International Application No. PCT/KR2019/012440 filed 25 Sep. 2019, which designated the U.S. and claims priority to KR Patent Application No. 10-2018-0115346 filed 27 Sep. 2018, the entire contents of each of which are hereby incorporated by reference.

The disclosure relates to an artificial intelligence (AI) system for mimicking functions of human brains, e.g., recognition and determination, by using a machine learning algorithm such as deep learning, and an application thereof. Particularly, the disclosure relates to a method and device for providing an interactive interface related to an event by using an AI system.

DESCRIPTION OF RELATED ART

Artificial intelligence (AI) systems are systems capable of implementing human level intelligence and refer to systems in which a machine autonomously learns, determines, and becomes smarter unlike existing rule-based smart systems. A recognition rate may be increased and preferences of a user may be understood more accurately in proportion to iterations of the AI systems, and thus the existing rule-based smart systems are gradually being replaced by the AI systems based on deep learning.

AI technology includes machine learning (or deep learning) and element technologies using machine learning.

Machine learning refers to an algorithm for classifying/learning features of input data, and the element technology refers to a technology for mimicking functions of human brains, e.g., recognition and determination, by using the machine learning algorithm such as deep learning, and includes fields of technologies such as linguistic understanding, visual understanding, inference/prediction, knowledge representation, and operation control.

Examples of various fields to which the AI technology is applicable are as described below. Linguistic understanding refers to a technology for recognizing and applying/processing languages/characters of humans, and includes natural language processing, machine translation, dialog systems, queries and responses, voice recognition/synthesis, etc. Visual understanding refers to a technology for recognizing and processing an object like human vision, and includes object recognition, object tracking, image search, human recognition, scene understanding, space understanding, image enhancement, etc. Inference/prediction refers to a technology for determining information and logically performing inference and prediction, and includes knowledge/probability-based inference, optimization prediction, preference-based planning, recommendation, etc. Knowledge representation refers to a technology for automatically processing human experience information into knowledge data, and includes knowledge construction (data generation/classification), knowledge management (data utilization), etc. Operation control refers to a technology for controlling autonomous driving of vehicles and motion of robots, and includes motion control (e.g., navigation, collision avoidance, or driving control), manipulation control (action control), etc.

SUMMARY

Provided is a method and system for providing emotional interaction to a user, based on emotion information of the user related to a user event.

BRIEF DESCRIPTION OF THE DRAWINGS

FIG. 3 is a schematic diagram for describing an operation of generating an event-emotion-based response model (or an artificial intelligence (AI) model) through deep learning, according to an embodiment.

FIG. 9 is a schematic diagram for describing an operation, performed by an electronic device, of obtaining emotion information of a user, based on a person, a place, or a time related to a user event, according to an embodiment.

FIG. 14 is a table for describing a tone determined based on emotion information of a user, according to an embodiment.

DETAILED DESCRIPTION OF EXAMPLE EMBODIMENTS

Figure 1:
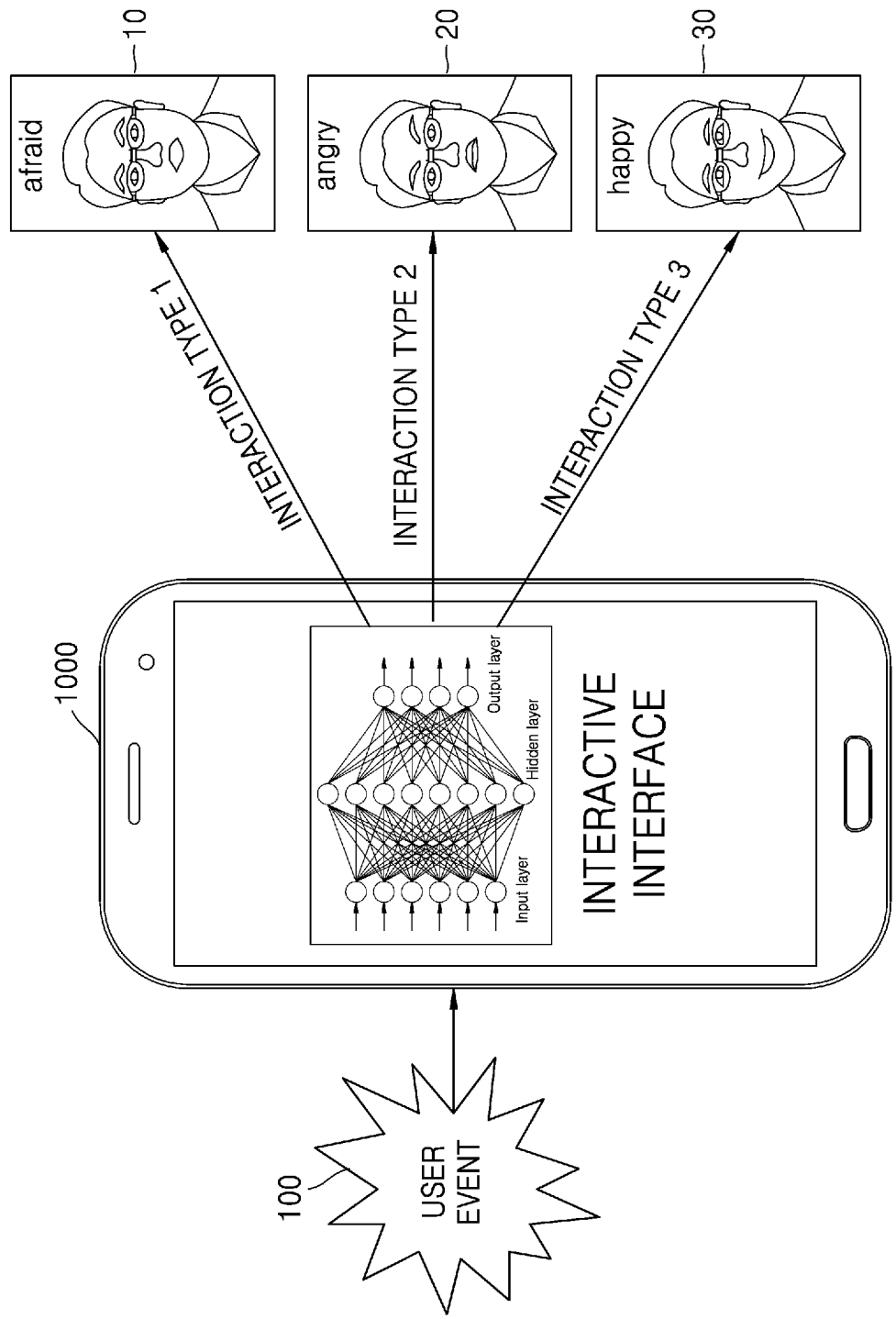
FIG. 1 is a schematic diagram of a system for providing event-emotion-based responses, according to an embodiment.

According to an embodiment, a method, performed by an electronic device, of providing a virtual assistant interface includes querying a user about schedule information by using the virtual assistant interface, receiving a response to the query from the user, the response including information about at least one event, identifying an emotional state of the user for the at least one event by analyzing the response to the query, learning emotion information of the user for the at least one event, based on the emotional state of the user, determining an interaction type for the at least one event, based on the emotion information of the user, and providing notification information for the at least one event through the virtual assistant interface, based on the interaction type.

The method, performed by the electronic device, of providing the virtual assistant interface may include receiving voice data of an utterance of the user, as the response to the query, extracting information related to the at least one event from the voice data, and registering the at least one event as a new event in the electronic device by using the extracted information.

The method, performed by the electronic device, of providing the virtual assistant interface may include obtaining default emotion information related to the at least one event from a table in which events are mapped to emotion information, identifying the emotional state of the user for the at least one event, based on information obtained by analyzing the voice data, and learning the emotion information of the user for the at least one event by modifying the default emotion information, based on the emotional state of the user.

The method, performed by the electronic device, of providing the virtual assistant interface may include determining a progress stage of the at least one event by comparing a current time to a scheduled time of the at least one event, and refining the emotion information of the user for the at least one event, based on the progress stage of the at least one event.

The method, performed by the electronic device, of providing the virtual assistant interface may include obtaining feedback information on the at least one event from the user after the at least one event is finished, and refining the emotion information of the user for the at least one event, based on the obtained feedback information.

The method, performed by the electronic device, of providing the virtual assistant interface may include learning the emotion information of the user by using information related to at least one of a person related to the at least one event, a scheduled time of the at least one event, and a place related to the at least one event.

The method, performed by the electronic device, of providing the virtual assistant interface may include determining a tone for providing the notification information for the at least one event, based on the emotion information of the user.

The method, performed by the electronic device, of providing the virtual assistant interface may include selecting a color corresponding to the emotion information of the user, and displaying the notification information for the at least one event by using the selected color.

The method, performed by the electronic device, of providing the virtual assistant interface may further include providing a response to an utterance of the user related to the at least one event, based on the determined interaction type.

The method, performed by the electronic device, of providing the virtual assistant interface may include determining a notification providing method related to the at least one event, considering a situation of the user, and providing the notification information for the at least one event, based on the determined notification providing method.

The method, performed by the electronic device, of providing the virtual assistant interface may further include providing a diary interface including the emotion information of the user related to the at least one event.

According to another embodiment, an electronic device includes an outputter configured to provide a virtual assistant interface, and at least one processor configured to query a user about schedule information by using the virtual assistant interface, receive a response to the query from the user, the response including information about at least one event, identify an emotional state of the user for the at least one event by analyzing the response to the query, learn emotion information of the user for the at least one event, based on the emotional state of the user, determine an interaction type for the at least one event, based on the emotion information of the user, and provide notification information for the at least one event through the virtual assistant interface, based on the interaction type.

According to another embodiment, a computer program product includes a recording medium having recorded thereon a program for executing a method including querying a user about schedule information by using the virtual assistant interface, receiving a response to the query from the user, the response including information about at least one event, identifying an emotional state of the user for the at least one event by analyzing the response to the query, learning emotion information of the user for the at least one event, based on the emotional state of the user, determining an interaction type for the at least one event, based on the emotion information of the user, and providing notification information for the at least one event through the virtual assistant interface, based on the interaction type.

According to another embodiment, a method, performed by an electronic device, of providing a virtual assistant interface includes providing notification information for at least one event through a virtual assistant interface to a user, obtaining feedback information of the user on the at least one event included in the notification information, identifying an emotional state of the user for the at least one event by analyzing the feedback information of the user, and learning emotion information of the user for the at least one event, based on the emotional state of the user.

According to another embodiment, an electronic device includes an outputter configured to provide a virtual assistant interface, and at least one processor configured to provide notification information for at least one event through a virtual assistant interface to a user, obtain feedback information of the user on the at least one event included in the notification information, identify an emotional state of the user for the at least one event by analyzing the feedback information of the user, and learn emotion information of the user for the at least one event, based on the emotional state of the user.

According to another embodiment, a computer program product includes a recording medium having recorded thereon a program for executing a method including providing notification information for at least one event through a virtual assistant interface to a user, obtaining feedback information of the user on the at least one event included in the notification information, identifying an emotional state of the user for the at least one event by analyzing the feedback information of the user, and learning emotion information of the user for the at least one event, based on the emotional state of the user.

According to another embodiment, a method, performed by an electronic device, of providing an interactive interface includes obtaining emotion information of a user related to a user event registered in the electronic device, determining an interaction type corresponding to the user event, based on the emotion information of the user, and providing a response to an utterance of the user related to the user event, based on the determined interaction type.

According to another embodiment, an electronic device includes an outputter configured to provide an interactive interface, at least one processor, and a memory storing at least one instruction executed by the at least one processor to direct the electronic device to obtain emotion information of a user related to a user event registered in the electronic device, determine an interaction type corresponding to the user event, based on the emotion information of the user, and provide a response to an utterance of the user related to the user event through the interactive interface, based on the determined interaction type.

According to another embodiment, a computer program product includes a recording medium having recorded thereon a program for executing a method including obtaining emotion information of a user related to a user event, determining an interaction type corresponding to the user event, based on the emotion information of the user, and providing a response to an utterance of the user related to the user event, based on the determined interaction type.

MODE OF DISCLOSURE

Terminology used in this specification will now be briefly described before describing the disclosure in detail.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms that are arbitrarily selected by the applicant may be used and, in this case, the meanings of these terms may be described in corresponding parts of the detailed description. Therefore, it is noted that the terms used herein are construed based on practical meanings thereof and the whole content of this specification, rather than being simply construed based on names of the terms.

It will be understood that the terms "comprises", "comprising", "includes" and/or "including", when used herein, specify the presence of stated elements, but do not preclude the presence or addition of one or more other elements. The term " . . . unit" or " . . . module" is used to denote an entity for performing at least one function or operation, and may be implemented using hardware, software, or a combination of hardware and software.

Hereinafter, the disclosure will be described in detail by explaining embodiments of the disclosure with reference to the attached drawings. The disclosure may, however, be embodied in many different forms and is not construed as being limited to the embodiments of the disclosure set forth herein. In the drawings, parts not related to embodiments of the disclosure are not illustrated for clarity of explanation, and like reference numerals denote like elements throughout.

FIG. 1 is a schematic diagram of a system for providing event-emotion-based responses, according to an embodiment.

Referring to FIG. 1, the system for providing event-emotion-based responses, according to an embodiment may include an electronic device 1000. According to an embodiment, in addition to the electronic device 1000, the system for providing event-emotion-based responses may further include a server (not shown), and a wearable device for measuring a biometric signal of a user. An embodiment in which the system for providing event-emotion-based responses includes the electronic device 1000 and an external wearable device will be described in detail below with reference to FIG. 12.

The electronic device 1000 according to an embodiment may be implemented in various forms. For example, as used herein, the electronic device 1000 may include a digital camera, a smartphone, a laptop computer, a tablet PC, an e-book reader, a digital broadcast receiver, a personal digital assistant (PDA), a portable multimedia player (PMP), a navigation system, or an MP3 player, but is not limited thereto. As used herein, the electronic device 1000 may be a wearable device that may be worn by a user. The wearable device may include at least one of an accessory-type device (e.g., a watch, a ring, a wrist band, an ankle band, necklace, glasses, or contact lenses), a head-mounted device (HMD), a fabric- or clothes-integrated device (e.g., electronic clothing), a body-attachable device (e.g., a skin pad)), and a body-implantable device (e.g., an implantable circuit), but is not limited thereto. In the following description, for convenience of explanation, a case in which the electronic device 1000 is a smartphone will be described as an example.

According to an embodiment, the electronic device 1000 may be a device for providing an interactive interface. The interactive interface may be a user interface for receiving an input (e.g., a voice input or a text input) from a user and providing a response to the input from the user. According to an embodiment, the interactive interface may include, for example, a virtual assistant or an artificial intelligence (AI) assistant, but is not limited thereto. The virtual assistant or the AI assistant may be a software agent for processing a task required by a user and providing a service specialized for the user.

According to an embodiment, the electronic device 1000 may obtain (or analyze or inter) an emotional state of a user related to a user event 100 by using an AI model, and adaptively provide a response through the interactive interface, based on the emotional state of the user. For example, when an emotional state of a first user related to the user event 100 is an afraid state 10, the electronic device 1000 may determine a first interaction type, and respond to an utterance of the first user, based on the first interaction type. When the emotional state of the first user related to the user event 100 is an angry state 20, the electronic device 1000 may determine a second interaction type, and respond to an utterance of the first user, based on the second interaction type. When the emotional state of the first user related to the user event 100 is a happy state 30, the electronic device 1000 may determine a third interaction type, and respond to an utterance of the first user, based on the third interaction type. Herein, the first to third interaction types may be different types and thus the electronic device 1000 may provide event-based emotional interaction to the user.

As used herein, the user event 100 may be an event related to the user, e.g., an event detected by the electronic device 1000 during a conversation with the user, or an event pre-registered by the user in, for example, a scheduling application, a calendar application, a contact list application, or a social networking service (SNS) application. According to an embodiment, the user event 100 may include, for example, an event related to work (e.g., a meeting, a presentation, or a business trip), an event related to an acquaintance (e.g., a wedding of a friend, a birthday party of a family member, or a wedding anniversary), an event related to hobbies (e.g., watching a sport game, watching a movie, reservation of a ticket for a musical performance, a photography club event, participation in a tennis game, or participation in a marathon race), an event related to a celebrity (e.g., a concert or a fan meeting), or an official event (e.g., a presidential election, the World Cup, or Christmas), but is not limited thereto.

AI-related functions according to the disclosure are performed using a processor and a memory. The processor may include one or more processors. In this case, the one or more processors may be general-purpose processors such as a central processing unit (CPU), an application processor (AP), and a digital signal processor (DSP), dedicated graphics processors such as a graphics processing unit (GPU) and a vision processing unit (VPU), or dedicated AI processors such as a numeric processing unit (NPU). The one or more processors control processing of input data based on a predefined operation rule or AI model stored in the memory. Alternatively, when the one or more processors are dedicated AI processors, the dedicated AI processors may be designed in a hardware structure specialized in processing a specific AI model.

The predefined operation rule or AI model is made through training. Herein, being made through training means that a basic AI model is trained based on multiple pieces of training data by using a learning algorithm and thus a predefined operation rule or AI model configured to achieve desired characteristics (or purposes) is made. The training may be performed by a device having an AI function according to the disclosure, or by a separate server and/or system. The learning algorithm may include, for example, supervised learning, unsupervised learning, semi-supervised learning, or reinforcement learning, but is not limited thereto.

The AI model may include a plurality of neural network layers. Each of the plurality of neural network layers has a plurality of weight values and performs neural network calculation through calculation between a calculation result of a previous layer and the plurality of weight values. The plurality of weight values of the plurality of neural network layers may be optimized by a result of training the AI model. For example, the plurality of weight values may be modified to reduce or minimize a loss value or a cost value obtained by the AI model during the training process. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

Therefore, according to an embodiment, events meaningful to a user may be detected through a conversation, and proactive interaction or necessary information may be provided to the user, based on the detected events, thereby providing true emotional interaction. An operation, performed by the electronic device 1000, of providing emotional interaction, based on an emotional state of a user for the user event 100 will now be described in detail with reference to FIG. 2.

Figure 2:
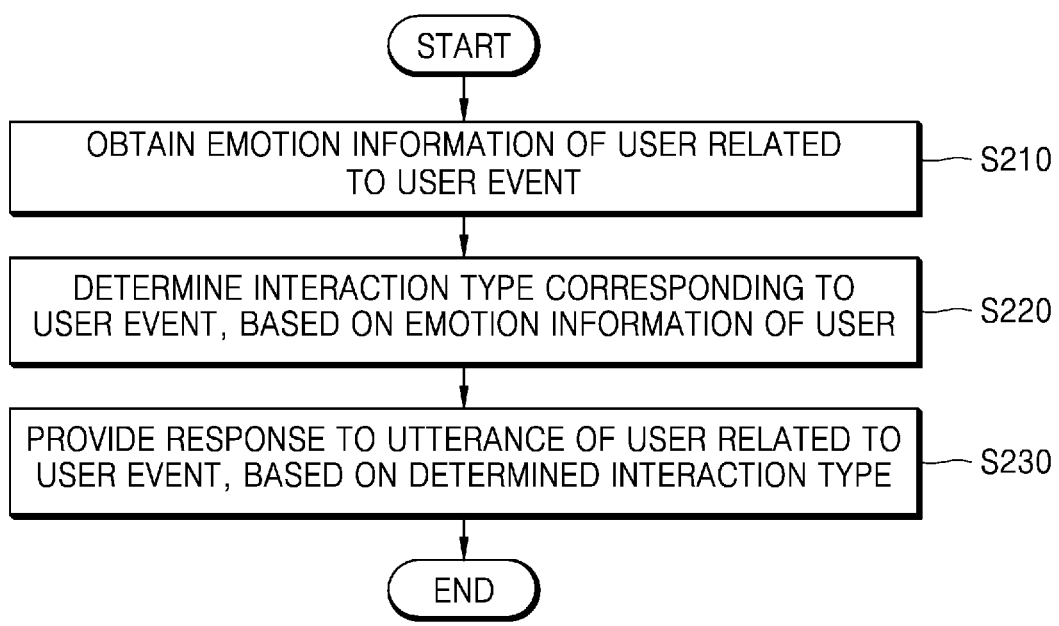
FIG. 2 is a flowchart of a method, performed by an electronic device, of providing an interactive interface, according to an embodiment.

FIG. 2 is a flowchart of a method, performed by the electronic device 1000, of providing an interactive interface, according to an embodiment.

In operation S210, the electronic device 1000 may obtain emotion information of a user related to a user event registered in the electronic device 1000.

According to an embodiment, the electronic device 1000 may check a user event registered in an event database (DB). The event DB may include or be connected to, for example, a scheduling application (e.g., a to-do list application), a calendar application, an SNS application, or a contact list application. The user event may be an event manually input by the user, or an event automatically input by the electronic device 1000 or a server.

According to an embodiment, the electronic device 1000 may obtain the emotion information of the user related to the user event by analyzing a response from the user and leaning the emotion information of the user related to the user event. For example, the electronic device 1000 may query the user about schedule information by using a virtual assistant interface. In this case, the electronic device 1000 may receive, from the user, a response including information about at least one event. The electronic device 1000 may identify an emotional state of the user for the at least one event by analyzing the response received from the user. The electronic device 1000 may learn emotion information of the user for the at least one event. Herein, the learning of the emotion information of the user for the at least one event may mean determining a weight of at least one emotion element connected to the at least one event.

According to an embodiment, the electronic device 1000 may extract a user event from voice data of an utterance of the user, and register the extracted user event as a new event in the event DB. The operation, performed by the electronic device 1000, of extracting the user event from the voice data of the utterance of the user will be described in detail below with reference to FIG. 4.

According to an embodiment, the emotion information of the user related to the user event may be information about an emotional state of the user for the user event. Herein, the emotion information of the user may be information indicating a single emotional state, or information indicating a complex emotional state including two or more emotions. For example, the emotion information may include at least one emotion from among joy, nervousness, afraidness, happiness, fear, displeasure, annoyance, embarrassment, sadness, depression, regret, jealousy, disappointment, confidence, love, hatred, love and hatred, interest, exciting, stability, relief, and horror, but is not limited thereto.

According to an embodiment, the electronic device 1000 may obtain the emotion information of the user related to the user event at a time when an utterance of the user related to the user event is detected. According to another embodiment, the electronic device 1000 may obtain the emotion information of the user for the user event to proactively provide interaction before an utterance of the user related to the user event. For example, the electronic device 1000 may check a scheduled time of the user event, and obtain current emotion information of the user for the user event to provide a notification related to the user event 10 minutes before the user event.

According to an embodiment, the electronic device 1000 may obtain the emotion information of the user related to the user event by using the AI model. For example, the electronic device 1000 may obtain the emotion information of the user corresponding to a specific user event from an event-emotion DB generated (or refined) by the AI model. The event-emotion DB may store average emotion information of ordinary people for a specific event, or emotion information personalized per user for a specific event, but is not limited thereto.

According to an embodiment, the AI model may be trained based on at least one of emotion information analyzed by an expert and previous emotion information of the user. The AI model may be stored in the electronic device 1000 or in a server (e.g., a cloud server) connected to the electronic device 1000. The AI model will be described in detail below with reference to FIG. 3.

According to an embodiment, the electronic device 1000 may determine a progress stage of a user event by comparing a current time to a scheduled time of the user event. Herein, the current time may include a time when an utterance is detected from a user, but is not limited thereto. For example, the electronic device 1000 may determine whether the current time is a time before the user event occurs or a time after the user event is finished. The electronic device 1000 may obtain emotion information of the user related to the user event, considering the progress stage of the user event. For example, when the user event is participation in a marathon race, before the user event occurs, the electronic device 1000 may determine the emotion information of the user as 'nervousness weight: 0.5, joy weight: 0.5'. On the other hand, after the user event (e.g., participation in a marathon race) is finished, the electronic device 1000 may determine the emotion information of the user as 'happiness weight: 0.3, joy weight: 0.7'.

According to an embodiment, the electronic device 1000 may obtain the emotion information of the user, considering additional information related to the user event. For example, the electronic device 1000 may subdivide the emotion information of the user, considering at least one of a person related to the user event, a scheduled time of the user event, and a place related to the user event. In this case, the electronic device 1000 may obtain the additional information related to the user event by directly querying the user about the additional information or by parsing an email, a message, or the like. The operation, performed by the electronic device 1000, of subdividing the emotion information of the user, considering the additional information related to the user event will be described in detail below with reference to FIG. 9.

According to an embodiment, the electronic device 1000 may obtain default emotion information related to the user event from a table in which events are mapped to emotion information. The default emotion information may be previous emotion information of the user related to the user event or average emotion information of ordinary people for the user event. The table in which events are mapped to emotion information may be stored in the event-emotion DB connected to the AI model, but is not limited thereto.

According to an embodiment, the electronic device 1000 may obtain actual emotion information of the user related to the user event by obtaining biometric information of the user (e.g., heart rate information, pulse information, breathing information, eye twitching information, facial expression change information, sweating information, body temperature change information, or voice input), and modifying the default emotion information related to the user event, based on the biometric information of the user. For example, the electronic device 1000 may obtain the default emotion information related to at least one event from the table in which events are mapped to emotion information, identify an emotional state of the user for the at least one event, based on information obtained by analyzing voice data of an utterance of the user, and learn the emotion information of the user for the at least one event by modifying the default emotion information, based on the emotional state of the user. The modifying of the default emotion information may mean adjusting a weight corresponding to each of emotion elements included in the default emotion information. For example, when the default emotion information is 'nervousness weight: 0.3, joy weight: 0.7', the electronic device 1000 may increase the nervousness weight from '0.3' to '0.6' and reduce the joy weight from '0.7' to '0.4', based on the biometric information of the user.

According to an embodiment, the electronic device 1000 may obtain the biometric information of the user by using a sensor included therein, or obtain the biometric information of the user from an external device (e.g., an external wearable device). For example, the electronic device 1000 may obtain a face image of the user by using at least one camera (e.g., a general image sensor, an infrared sensor, or a depth sensor), and detect a facial expression change or eye twitching of the user by analyzing the face image of the user. In addition, the electronic device 1000 may detect a change in body temperature of the user by using the infrared sensor. In this case, the electronic device 1000 may predict a current emotional state of the user, based on the facial expression change or the eye twitching of the user. Furthermore, the electronic device 1000 may receive voice data through a microphone from the user, and predict an actual emotional state of the user by analyzing the voice data. The operation, performed by the electronic device 1000, of receiving the biometric information of the user from the external device will be described in detail below with reference to FIG. 12.

In operation S220, the electronic device 1000 may determine an interaction type corresponding to the user event, based on the emotion information of the user.

Herein, the interaction type refers to an interaction style that is taken to provide a response to the user, and a range of additional information to be provided in addition to information related to the user event, a tone for providing interaction, etc. may differ depending on the interaction type. For example, the interaction type may include an encourage type (e.g., change topics weight: 0.3, cheer-up weight: 0.7), an empathize type (e.g., empathize weight: 0.9, cheer-up weight: 0.1)), a console type (e.g., console weight: 0.8, empathize weight: 0.2), or a cheer-up type (e.g., cheer-up weight: 0.9, provide additional information weight: 0.1), but is not limited thereto.

According to an embodiment, when the emotion information of the user for a first event is 'nervousness weight: 0.9' and 'joy weight: 0.1', the electronic device 1000 may determine the interaction type corresponding to the first event as the 'encourage type'. When the emotion information of the user for a second event is 'joy weight: 0.9' and 'nervousness weight: 0.1', the electronic device 1000 may determine the interaction type corresponding to the second event as the 'empathize type'.

According to an embodiment, the electronic device 1000 may determine the interaction type corresponding to the user event by using the AI model. For example, the electronic device 1000 may determine the interaction type mapped to the emotion information, based on an interaction method DB generated (or refined) by the AI model. The interaction method DB may store a table in which emotion information is mapped to interaction types, but is not limited thereto.

According to an embodiment, the electronic device 1000 may determine the interaction type by reflecting preferences of the user. For example, the electronic device 1000 may determine information indicating whether to use a simple image (e.g., an emoticon) to provide interaction, an interaction method (e.g., an interaction method using text, an interaction method using voice, or an interaction method using a notification window), or a voice color, by reflecting preferences of the user.

According to an embodiment, the electronic device 1000 may determine a tone for providing interaction on an utterance of the user, considering the emotion information of the user. In addition, the electronic device 1000 may determine a color for providing interaction on an utterance of the user, considering the emotion information of the user. The operation, performed by the electronic device 1000, of determining the tone or the color will be described in detail below with reference to FIGS. 14 and 15.

In operation S230, the electronic device 1000 may provide a response to an utterance of the user related to the user event, based on the determined interaction type. Herein, the providing of the response to the utterance of the user may include proactive interaction for inducing an utterance of the user (e.g., providing a notification related to the user event).

According to an embodiment, the electronic device 1000 may provide the response to the utterance of the user related to the user event by using the AI model. For example, the electronic device 1000 may extract a response corresponding to the utterance of the user from a response DB generated (or refined) by the AI model. The response DB may store a table in which interaction types are mapped to phrases inputable from the user, and response phrases, but is not limited thereto.

A case in which a first phrase is input from the user will now be described as an example. The electronic device 1000 may select a first response phrase when the determined interaction type is the encourage type, or select a second response phrase when the determined interaction type is the empathize type.

According to an embodiment, for different interaction types, the same response phrase may be selected with different pieces of additional information. The case in which the first phrase is input from the user will now be described as an example. When the determined interaction type is the encourage type, the electronic device 1000 may select the first response phrase and select first text as the additional information. Otherwise, when the determined interaction type is the empathize type, the electronic device 1000 may select the first response phrase and select second text as the additional information.

According to an embodiment, the electronic device 1000 may provide the response in the form of text on a chat window, or in the form of voice. The electronic device 1000 may provide the response in the form of text on a notification window (e.g., a pop-up window), but is not limited thereto.

According to an embodiment, the electronic device 1000 may select a color corresponding to the emotion information of the user and display the response to the utterance of the user related to the user event by using the selected color. For example, when a first color is selected based on first emotion information of the user for the first event, the electronic device 1000 may provide the response on a notification window displayed in the first color. Otherwise, when a second color is selected based on second emotion information of the user for the second event, the electronic device 1000 may provide the response on a notification window displayed in the second color.

According to an embodiment, the electronic device 1000 may provide the response by applying an expression style preferred by the user. For example, when 'You can do it' and 'Go for it' are providable as the response to the first phrase input from the user, the electronic device 1000 may select 'You can do it' corresponding to the expression style preferred by the user.

The electronic device 1000 may select a tone preferred by the user, voice preferred by the user, a notification method preferred by the user, or a color preferred by the user, but is not limited thereto.

According to an embodiment, the electronic device 1000 may consider a situation of the user for proactive interaction. For example, the electronic device 1000 may determine a notification providing method related to the user event, considering the situation of the user. The electronic device 1000 may provide a notification related to the user event, based on the determined notification providing method. For example, the electronic device 1000 may merely display a notification (or a reminder) related to an evening event on a screen without sound when the user is giving a presentation in the afternoon, and then provide a notification (or a reminder) again in the form of vibration or sound when a current time is close to a scheduled time of the evening event.

According to an embodiment, the electronic device 1000 may provide a diary interface including the emotion information of the user related to the user event. For example, the electronic device 1000 may provide a simple image or graph indicating the emotion information of the user per progress stage of the user event. The operation, performed by the electronic device 1000, of providing the diary interface will be described in detail below with reference to FIGS. 16 and 17.

Although a case in which the electronic device 1000 provides a response to a voice input of the user is described above as an example in relation the FIG. 2, a user input is not limited thereto. The electronic device 1000 may also provide a response to a text input of the user, based on the emotion information of the user. An AI model will now be described in detail with reference to FIG. 3.

FIG. 3 is a schematic diagram for describing an operation of generating an event-emotion-based response model (or an AI model) through deep learning, according to an embodiment.

Referring to FIG. 3, according to an embodiment, an AI processor included in the electronic device 1000 or a server may generate an event-emotion-based response model 300 for determining an interaction method, by training an artificial neural network. In the following description, for convenience of explanation, the event-emotion-based response model 300 may also be called an AI model or a response model. The 'training' of the artificial neural network may mean constructing a mathematical model in which connection of neurons in the artificial neural network may make an optimal decision, by appropriately changing weights based on data.

According to an embodiment, the AI processor may obtain data created by an expert, published data, or the like as training data 301, and generate the event-emotion-based response model 300 by using the training data 301. The data created by the expert may include emotion information analyzed or extracted by the expert from phrases predicted to be uttered by a user. The published data may include emotion information analyzed or extracted from text collected from the web or an SNS server. For example, the published data may include emotion information of happiness analyzed/extracted from the phrase 'Skipped school today skipping school tomorrow haha'. The data created by the expert or the published data may be converted to a preset format and thus be used as the training data 301 for generating the event-emotion-based response model 300.

According to an embodiment, the AI processor may obtain emotion information (e.g., feedback information) input from the user, emotion information obtained from biometric information of the user, or the like as personalized training data 302, and generate the event-emotion-based response model 300 by using the personalized training data 302. The emotion information (e.g., the feedback information) input from the user or the emotion information obtained from the biometric information of the user may be converted to a preset format and thus be used as the personalized training data 302 for generating the event-emotion-based response model 300.

According to an embodiment, the event-emotion-based response model 300 may be trained using the training data 301 to generate an event-emotion DB 310, an interaction method DB 320, and a response DB 330. According to an embodiment, the event-emotion-based response model 300 may refine the event-emotion DB 310, the interaction method DB 320, and the response DB 330 by adding or refining the training data 301.

According to an embodiment, the event-emotion DB 310 is a DB that defines correlations between events and emotions, and may include a table in which events are mapped to emotion information. For example, the event-emotion DB 310 may include information such as "first event: nervousness (0.6), joy (0.4)" and "second event: fear (0.7), nervousness (0.3)".

According to an embodiment, the event-emotion DB 310 may store a table in which emotion information is subdivided based on times, people, and places related to the events. For example, the event-emotion-based response model 300 may subdivide emotion information of the user, considering the times, the people, and the places related to the events. When detailed information about the times, the people, and the places related to the events is not stored in an event DB, the event-emotion-based response model 300 may obtain the information by querying the user about the times, the people, and the places related to the events. The table in which emotion information is subdivided will be described in detail below with reference to FIG. 9.

According to an embodiment, the interaction method DB 320 is a DB that defines correlations between emotions and interaction methods, and may store a table in which emotion information is mapped to interaction types. For example, the interaction method DB 320 may include information such as "first emotion information (nervousness (0.6), joy (0.4))-first interaction type (change topics (0.3), encourage (0.7))" and "second emotion information (relief)-second interaction type (empathize (0.9))".

According to an embodiment, the response DB 330 is a DB that defines correlations between interaction methods (or interaction types) and response phrases, and may store a table in which interaction types are mapped to response phrases. For example, the response DB 330 may include information such as "first interaction type (e.g., encourage type: change topics (0.3), encourage (0.7))-response phrase (Go for it (0.6)/You can do it (0.4))".

According to an embodiment, the event-emotion-based response model 300 may obtain the personalized training data 302 and personalize the event-emotion DB 310, the interaction method DB 320, and the response DB 330 by using the personalized training data 302.

According to an embodiment, the electronic device 1000 may obtain feedback on a user event from the user after the user event is finished. The electronic device 1000 may input the feedback on the user event as the personalized training data 302 to the event-emotion-based response model 300. In this case, the event-emotion-based response model 300 may refine the table in which events are mapped to emotion information, which is included in the event-emotion DB 310, based on the feedback on the user event. For example, when the electronic device 1000 has determined the emotion information of the user for a first event as 'nervousness (0.5), joy (0.5)' but the feedback input from the user indicates that the emotion information of the user is 'nervousness (0.8), joy (0.2)', the electronic device 1000 may modify the emotion information of the user for the first event from 'nervousness (0.5), joy (0.5)' to 'nervousness (0.8), joy (0.2)' in the event-emotion DB 310.

According to an embodiment, the electronic device 1000 may obtain feedback on the emotion information of the user before the user event occurs. In this case, the event-emotion-based response model 300 of the electronic device 1000 may refine the emotion information of the user per progress stage of the user event, which is included in the event-emotion DB 310.

According to an embodiment, the electronic device 1000 may obtain biometric information of the user and personalize the event-emotion DB 310 by using actual emotion information of the user, which is predicted based on the biometric information.

The electronic device 1000 may personalize the interaction method DB 320 and the response DB 330 by obtaining information about an interaction type preferred by the user or an expression style preferred by the user.

A method, performed by the electronic device 1000, of detecting a new event from voice data of an utterance of a user, and providing a response to the utterance of the user related to the new event by using the event-emotion-based response model 300 will now be described in detail with reference to FIGS. 4 and 5.

Figure 4:
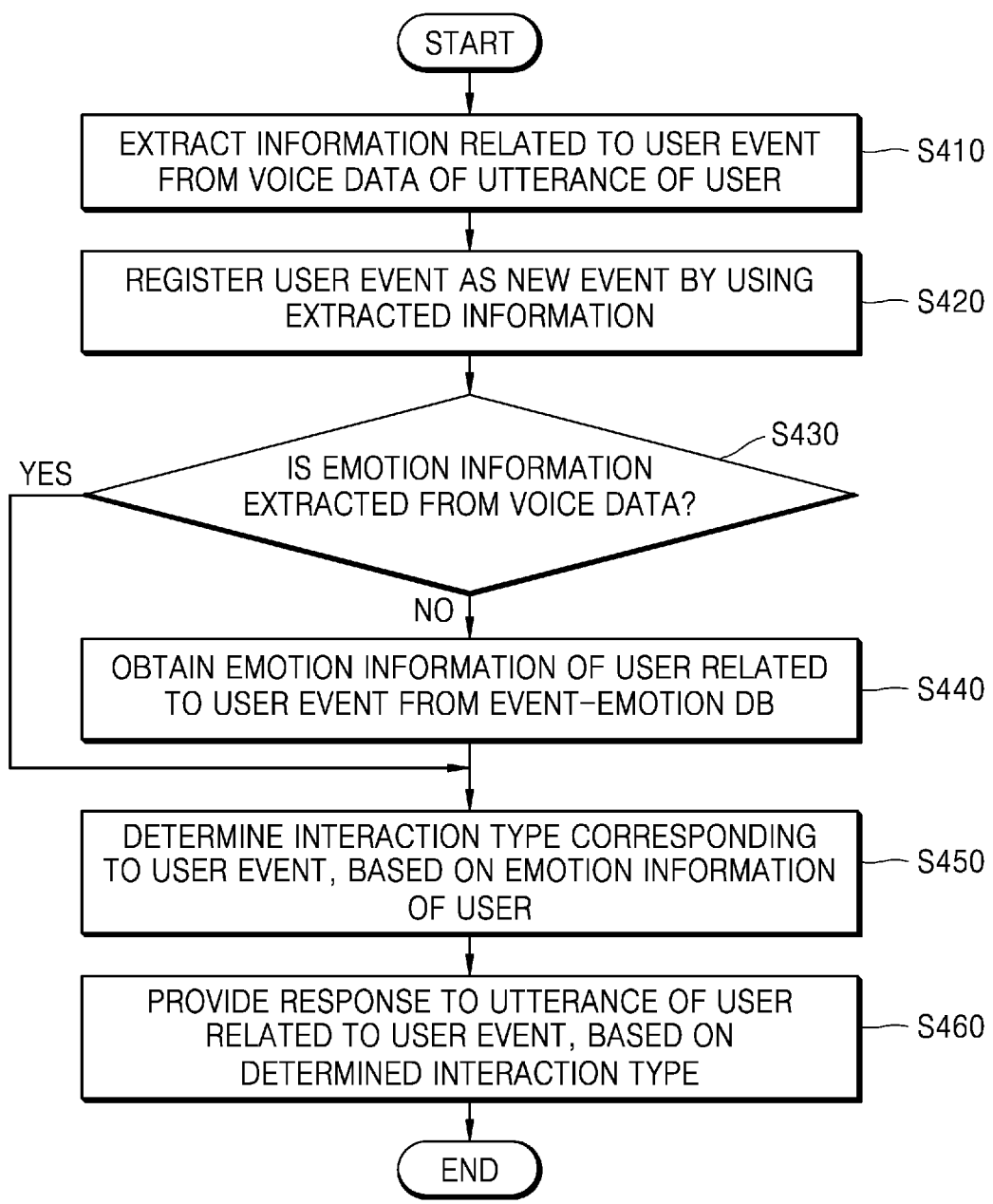
FIG. 4 is a flowchart of a method of registering a new event, based on voice data of an utterance of a user, according to an embodiment.

FIG. 4 is a flowchart of a method of registering a new event, based on voice data of an utterance of a user, according to an embodiment.

In operation S410, the electronic device 1000 may extract information related to a user event from voice data of an utterance of a user.

According to an embodiment, the electronic device 1000 may generate data as a result of analyzing the voice data, based on natural language processing. For example, the electronic device 1000 may convert the voice data into text data, and detect the information related to the user event from the text data, based on natural language processing. For example, the electronic device 1000 may detect a 'wedding' as a new user event by analyzing the voice data stating that 'My friend Jenna is having a wedding this Saturday', and obtain 'who gets married: Jenna, relationship: friend, wedding date: this Saturday (6/30)' as information related to the new user event (e.g., the wedding).

In operation S420, the electronic device 1000 may register the user event as a new event by using the extracted information. For example, the electronic device 1000 may register the wedding as a new event by storing, in an event DB connected to an AI model, the information (e.g., 'who gets married: Jenna, relationship: friend, wedding date: this Saturday (6/30)') related to the user event (e.g., the wedding) detected from the voice data.

According to an embodiment, the event DB may be connected to, for example, a scheduling application, a calendar application, a contact list application, or an SNS application, but is not limited thereto. The event DB is a DB that defines user events meaningful to the user, and may include information about events manually input by the user, and information about events automatically registered by a system.

In operation S430, the electronic device 1000 may extract emotion information of the user from the voice data of the utterance of the user. For example, the electronic device 1000 may convert the voice data into text data, and detect information related to an emotional state from the text data, based on natural language processing. For example, the electronic device 1000 may detect 'nervousness' as the emotion information of the user by analyzing voice data stating that 'I am nervous to sing at my friend Jenna's wedding this Saturday'.

In operation S440, when the emotion information of the user is not extracted from the voice data, the electronic device 1000 may obtain the emotion information of the user related to the user event from an event-emotion DB. Operation S440 may correspond to operation S220 of FIG. 2, and thus a detailed description thereof is not provided herein.

In operation S450, the electronic device 1000 may determine an interaction type corresponding to the user event, based on the emotion information of the user.

When the emotion information of the user is extracted from the voice data of the utterance of the user, the electronic device 1000 may determine the interaction type corresponding to the user event, based on the extracted emotion information. When the emotion information of the user is not extracted from the voice data of the utterance of the user, the electronic device 1000 may determine the interaction type corresponding to the user event, based on the emotion information of the user, which is obtained from the event-emotion DB.

According to an embodiment, the electronic device 1000 may determine an interaction type mapped to the emotion information, based on an interaction method DB generated (or refined) by the AI model. Operation S450 corresponds to operation S220 of FIG. 2, and thus a detailed description thereof is not provided herein.

In operation S460, the electronic device 1000 may provide a response to an utterance of the user related to the user event, based on the determined interaction type.

According to an embodiment, the electronic device 1000 may extract a response mapped to the interaction type, from a response DB generated (or refined) by the AI model, and provide the extracted response through an interactive interface to the user. Operation S460 corresponds to operation S230 of FIG. 2, and thus a detailed description thereof is not provided herein.

Figure 5:
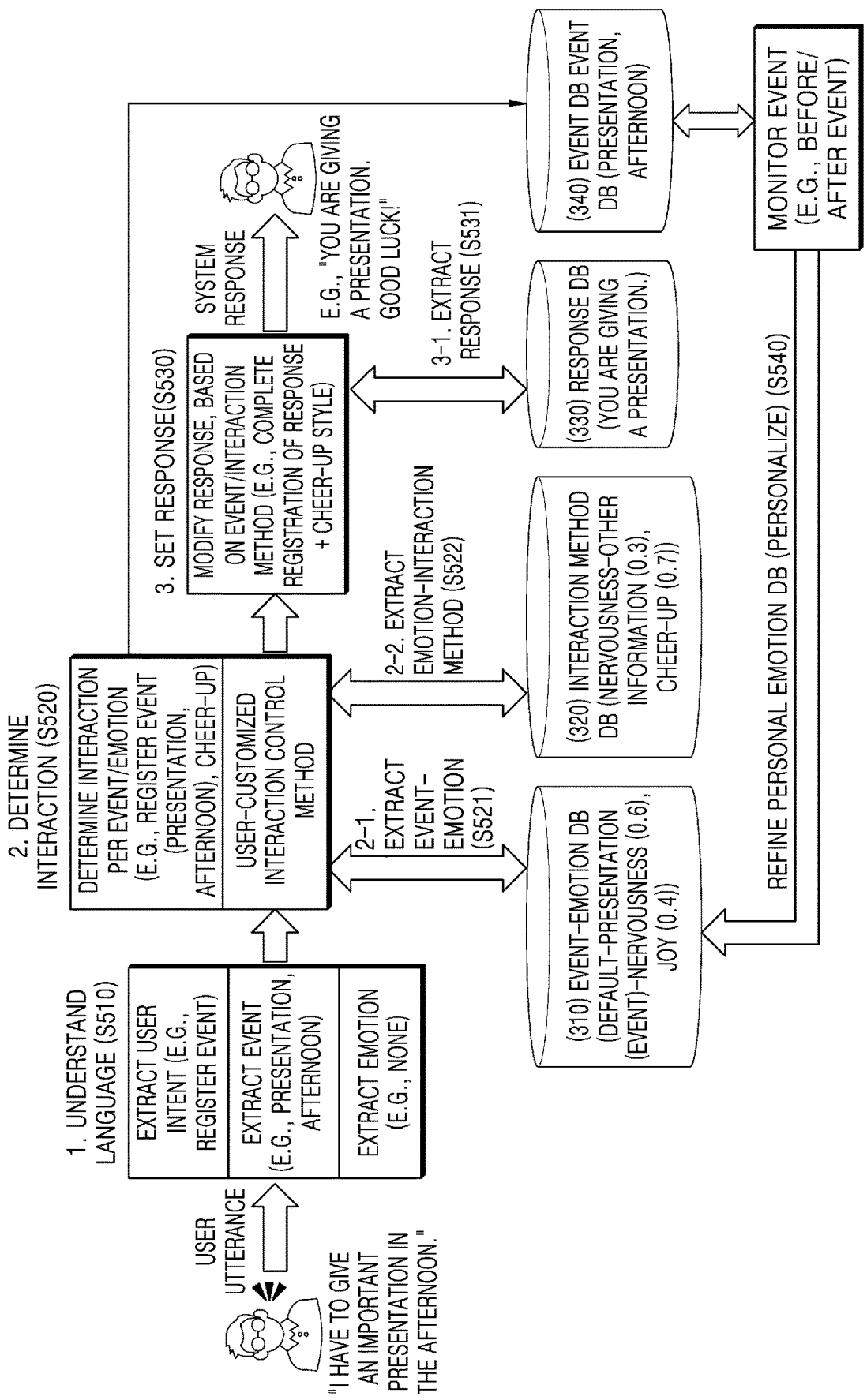
FIG. 5 is a schematic diagram for describing an operation, performed by an electronic device, of responding to an utterance of a user, according to an embodiment.

FIG. 5 is a schematic diagram for describing an operation, performed by the electronic device 1000, of responding to an utterance of a user, according to an embodiment.

In operation S510, when a user utters, the electronic device 1000 may obtain voice data of the user through a microphone, and understand language of the user by analyzing the voice data. That is, the electronic device 1000 may extract a user intent, extract information related to a user event, and extract emotion information for the user event from the voice data (S510). For example, when the user utters that 'I have to give an important presentation in the afternoon', the electronic device 1000 may extract 'register a new event' as the user intent, and extract 'presentation, afternoon' as information related to the new event. In this case, any emotion information may not be extracted from the utterance of the user.

In operation S520, when the language of the user is understood, the electronic device 1000 may determine interaction. For example, the electronic device 1000 may register 'presentation, afternoon' as a new event in an event DB 340 according to the user intent. In operation S521, the electronic device 1000 may extract first emotion information (e.g., 'nervousness weight: 0.6, joy weight: 0.4') corresponding to the presentation from the event-emotion DB 310. In operation S522, the electronic device 1000 may extract a first interaction method (e.g., first interaction type: other information (0.3), cheer-up (0.7)) corresponding to the first emotion information (e.g., 'nervousness weight: 0.6, joy weight: 0.4') from the interaction method DB 320.

In operation S530, the electronic device 1000 may set a response. For example, the electronic device 1000 may modify the response, based on the user event and the interaction method. In operation S531, the electronic device 1000 may extract 'You are giving a presentation' from the response DB 330 as a default response to the utterance of the user, and extract 'Good luck' as an additional response. The electronic device 1000 may output 'You are giving a presentation. Good luck!' through an interactive interface.

Because 'presentation, afternoon' is registered as the new event, the electronic device 1000 may monitor a progress of the 'presentation'. For example, the electronic device 1000 may obtain emotion information of the user before and after the presentation. The electronic device 1000 may refine a personal emotion DB, based on the obtained emotion information of the user. For example, the electronic device 1000 may personalize the event-emotion DB 310 by modifying default emotion information included in the event-emotion DB 310 (S540).

An operation, performed by the electronic device 1000, of responding to a user, based on emotion information of the user for a user event pre-registered in the event DB 340 will now be described.

Figure 6:
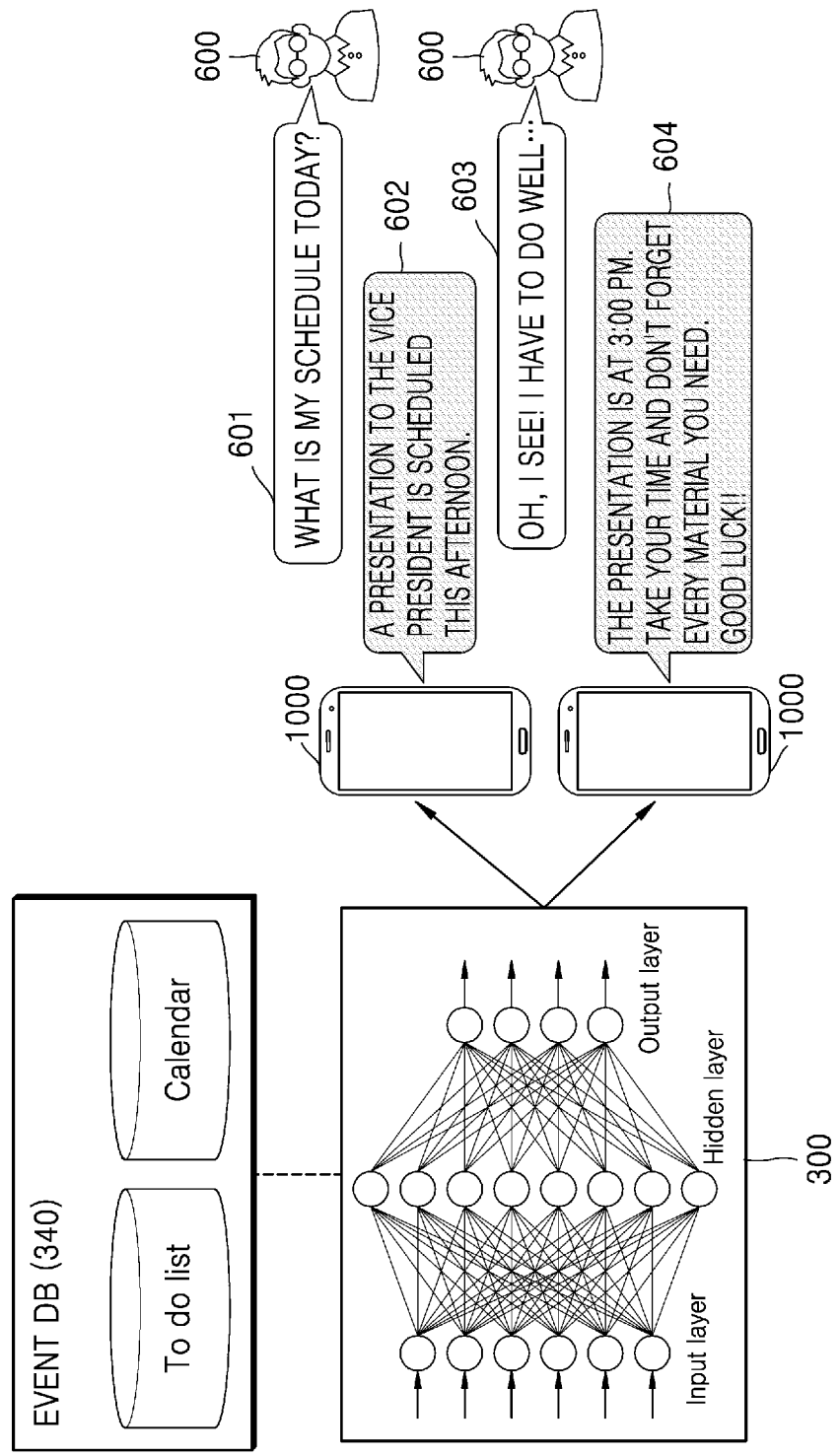
FIG. 6 is a schematic diagram for describing an operation, performed by an electronic device, of extracting a user event registered in an event database (DB), according to an embodiment.

FIG. 6 is a schematic diagram for describing an operation, performed by the electronic device 1000, of extracting a user event registered in the event DB 340, according to an embodiment.

The electronic device 1000 may receive first voice data 601 based on a first utterance of a user 600. For example, the electronic device 1000 may receive, from the user 600, a query input asking 'What is my schedule today?'. In this case, the electronic device 1000 may extract an intent of the user 600 (e.g., check today's schedule of the user 600) by analyzing the first voice data 601 received from the user 600.

The electronic device 1000 may access the event DB 340 connected to the event-emotion-based response model 300, to check today's schedule of the user 600 according to the intent of the user 600. The electronic device 1000 may check event information related to the user 600 (e.g., a presentation to the vice president) from the event DB 340, and provide a first response 602. For example, the electronic device 1000 may provide the first response 602 stating that 'A presentation to the vice president is scheduled this afternoon'.

In this case, the electronic device 1000 may receive second voice data 603 from the user 600 having heard the first response 602. For example, the electronic device 1000 may receive the second voice data 603 stating that 'Oh, I see! I have to do well . . . '. To provide a response to the second voice data 603, the electronic device 1000 may obtain, from an event-emotion DB, default emotion information (e.g., 'nervousness weight: 0.6, joy weight: 0.4') corresponding to a user event of 'a presentation to the vice president'. In addition, the electronic device 1000 may extract emotion information from the second voice data 603. For example, the electronic device 1000 may extract 'afraidness' as the emotion information from the second voice data 603. In this case, the electronic device 1000 may modify the default emotion information (e.g., 'nervousness weight: 0.6, joy weight: 0.4'), based on the emotion information (e.g., afraidness) extracted from the second voice data 603. For example, the electronic device 1000 may modify the default emotion information (e.g., 'nervousness weight: 0.6, joy weight: 0.4') to 'nervousness weight: 0.6, joy weight: 0.1, afraidness weight: 0.3'.

The electronic device 1000 may determine an interaction type as an 'encourage type (provide necessary information+ add encouraging phrases)', based on the modified emotion information (e.g., 'nervousness weight: 0.6, joy weight: 0.1, afraidness weight: 0.3'). The electronic device 1000 may provide a second response 604 in the encourage type. For example, the electronic device 1000 may output the second response 604 stating that 'The presentation is at 3:00 PM (provide necessary information). Take your time and don't forget every material you need. Good luck. (add encouraging phrases)'.

Figure 7:
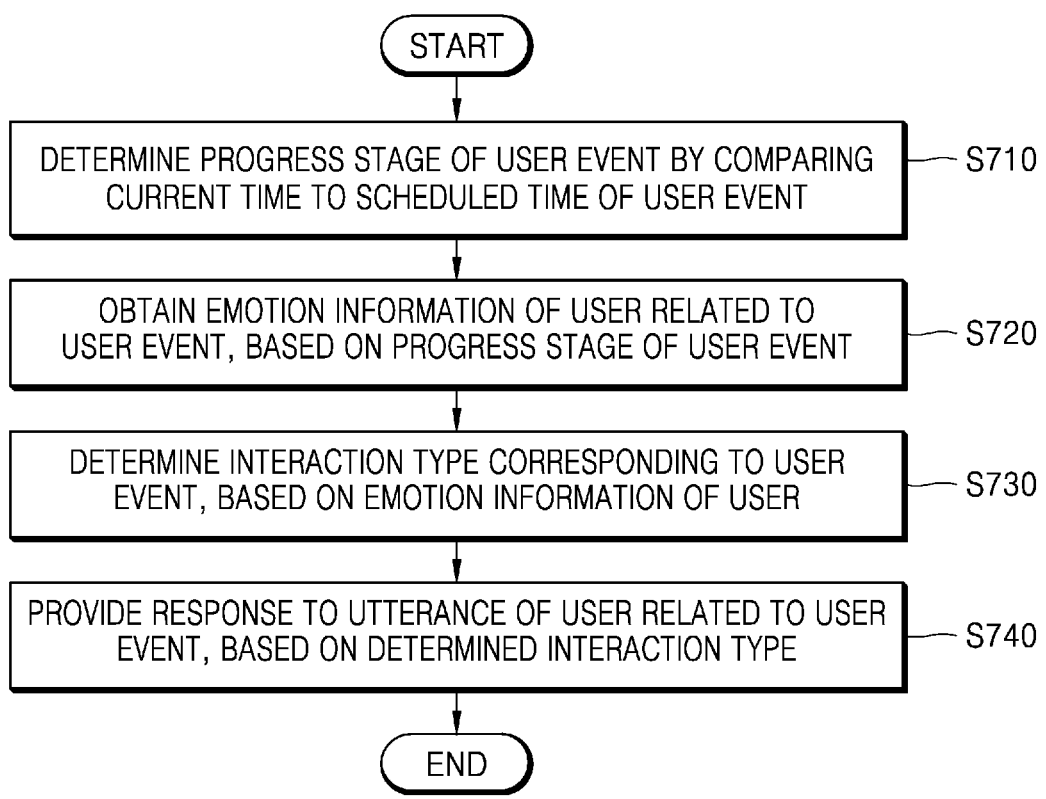
FIG. 7 is a flowchart of a method, performed by an electronic device, of obtaining emotion information of a user, based on a progress stage of a user event, according to an embodiment.

FIG. 7 is a flowchart of a method, performed by the electronic device 1000, of obtaining emotion information of a user, based on a progress stage of a user event, according to an embodiment.

In operation S710, the electronic device 1000 may determine a progress stage of a user event by comparing a current time to a scheduled time of the user event. Herein, the progress stage of the user event may include, for example, a stage (e.g., a day, 1 hour, or 10 minutes) before an event occurs, a stage during the event, or a stage after the event is finished, but is not limited thereto.

For example, when the scheduled time of the user event is 3:00 PM and the current time is 2:00 PM, the electronic device 1000 may determine the progress stage of the user event as '1 hour before the user event occurs'.

According to an embodiment, the current time may be a time when an utterance is detected from a user. That is, the electronic device 1000 may determine whether the utterance is detected from the user before the user event occurs or after the user event is finished.

In operation S720, the electronic device 1000 may obtain emotion information of the user related to the user event, based on the progress stage of the user event.

Because an emotional state of the user for the user event may probably change before and after the user event, the electronic device 1000 may obtain the emotion information of the user, considering the progress stage of the user event. For example, the electronic device 1000 may extract a low 'nervousness weight' after the user event is finished compared to before the user event occurs.

In operation S730, the electronic device 1000 may determine an interaction type corresponding to the user event, based on the emotion information of the user.

According to an embodiment, the electronic device 1000 may determine an interaction type mapped to the emotion information, based on an interaction method DB generated (or refined) by an AI model. Operation S730 corresponds to operation S220 of FIG. 2, and thus a detailed description thereof is not provided herein.

In operation S740, the electronic device 1000 may provide a response to an utterance of the user related to the user event, based on the determined interaction type.

According to an embodiment, the electronic device 1000 may extract a response mapped to the interaction type, from a response DB generated (or refined) by the AI model, and provide the extracted response through an interactive interface to the user. In this case, the response may include a proactive response (e.g., providing a notification for the user event). Operation S740 corresponds to operation S230 of FIG. 2, and thus a detailed description thereof is not provided herein.

Figure 8:
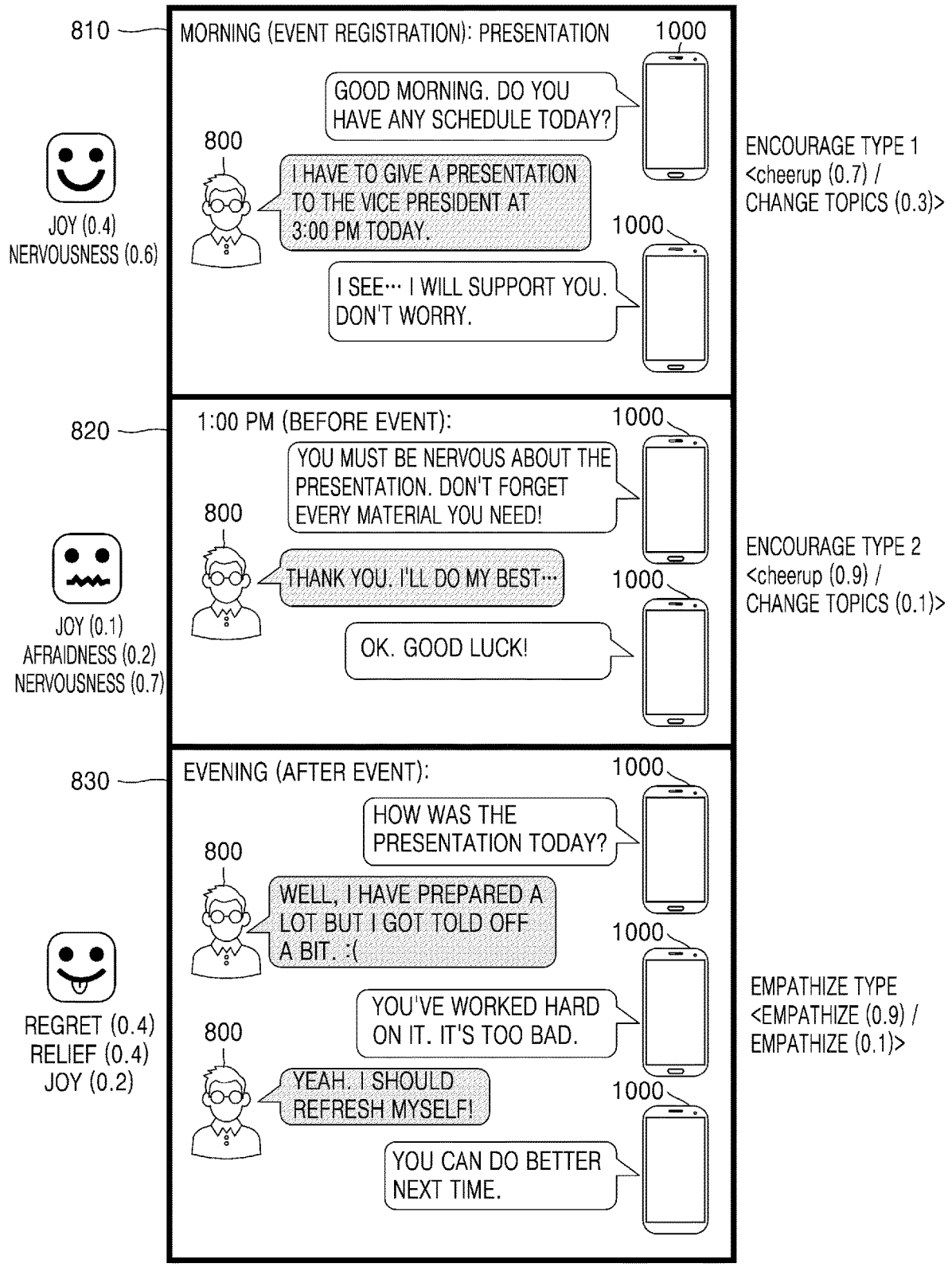
FIG. 8 is a schematic diagram for describing an operation, performed by an electronic device, of providing a notification or a response, based on a progress stage of a user event, according to an embodiment.

FIG. 8 is a schematic diagram for describing an operation, performed by the electronic device 1000, of providing a notification or a response, based on a progress stage of a user event, according to an embodiment.

To check any new event to be registered in an event DB, the electronic device 1000 may start a conversation with a user 800 every morning 810 by stating that "Good morning. Do you have any schedule today?". In this case, when a first utterance stating that 'I have to give a presentation to the vice president at 3:00 PM today' is detected from the user 800, the electronic device 1000 may register '3:00 PM, a presentation to the vice president' as a new event by analyzing voice data of the user 800. The electronic device 1000 may obtain emotion information (e.g., joy weight: 0.4, nervousness weight: 0.6) corresponding to 'a presentation to the vice president' by using an AI model, and determine an interaction type for the first utterance, based on the emotion information (e.g., joy weight: 0.4, nervousness weight: 0.6). For example, the electronic device 1000 may determine a first encourage type (e.g., cheer-up weight: 0.7, change topics weight: 0.3) as the interaction type. The electronic device 1000 may output a response to the first utterance (e.g., I see . . . I will support you. Don't worry.), based on the first encourage type.

Before providing a notification related to a user event, to the user 800, the electronic device 1000 may compare a current time (e.g., 1:00 PM) to a scheduled time (e.g., 3:00 PM) of the user event (e.g., a presentation to the vice president). The electronic device 1000 may determine that the current time corresponds to a time 820 before the user event (e.g., a presentation to the vice president) occurs, based on the comparison result.

The electronic device 1000 may obtain emotion information (e.g., joy weight: 0.1, afraidness weight: 0.2, nervousness weight: 0.7) of the user 800, considering that the current time corresponds to the time 820 before the user event occurs. The electronic device 1000 may determine a second encourage type (e.g., cheer-up weight: 0.9, change topics weight: 0.1) as an interaction type corresponding to the emotion information (e.g., joy weight: 0.1, afraidness weight: 0.2, nervousness weight: 0.7) of the user 800. The electronic device 1000 may provide proactive interaction, based on the second encourage type. For example, the electronic device 1000 may provide a notification stating that 'You must be nervous about the presentation. Don't forget every material you need!'. When the user 800 utters that 'Thank you. I'll do my best . . . ' in response to the notification of the electronic device 1000, the electronic device 1000 may output a response stating that 'OK. Good luck!'.

At a time 830 after the user event is finished, the electronic device 1000 may query the user 800 about emotion information related to the user event. For example, the electronic device 1000 may output a query asking 'How was the presentation today?'. When the user 800 answers that 'Well, I have prepared a lot but I got told off a bit' in response to the query, the electronic device 1000 may obtain emotion information of the user 800, considering that the current time corresponds to the time 830 after the user event is finished. In this case, the electronic device 1000 may extract emotion information from voice data of the user 800. For example, the electronic device 1000 may obtain 'regret weight: 0.4, relief weight: 0.4, joy weight: 0.2' as the emotion information for the presentation.

The electronic device 1000 may determine an empathize type (e.g., empathize weight: 0.9, provide other information weight: 0.1) as an interaction type corresponding to the emotion information (e.g., regret weight: 0.4, relief weight: 0.4, joy weight: 0.2) of the user 800. The electronic device 1000 may provide a first response stating that 'You've worked hard on it. It's too bad', based on the determined interaction type (e.g., the empathize type). When the user 800 utters that 'Yeah. I should refresh myself!' in response to the first response, the electronic device 1000 may output a second response stating that 'You can do better next time'.

The electronic device 1000 may record the emotion information of the user 800 after the user event is finished, and re-use the emotion information later. For example, when a similar event occurs to the user 800 later, the electronic device 1000 may remind the user 800 about information related to a previous user event, and induce the user 800 to recall a good memory.

FIG. 9 is a schematic diagram for describing an operation, performed by the electronic device 1000, of obtaining emotion information of a user, based on a person, a place, or a time related to a user event, according to an embodiment.

According to an embodiment, in the event-emotion DB 310 connected to the AI model 300, emotion information based on an event 900 may be subdivided based on a person, a place, or a time related to the event 900. In this case, the electronic device 1000 may obtain detailed emotion information of a user, based on the person, the place, or the time related to the event 900.

For example, when the event 900 is a presentation 910, the electronic device 1000 may determine the emotion information of the user as 'nervousness weight: 0.4, joy weight: 0.6' by default. However, when information about a person to whom the presentation 910 is given is obtained, the electronic device 1000 may determine the emotion information of the user, considering the information about the person to whom the presentation 910 is given. For example, when the person to whom the presentation 910 is given is the chief executive officer (CEO), the electronic device 1000 may determine the emotion information of the user as 'nervousness weight: 0.9, joy weight: 0.1'. Otherwise, when the person to whom the presentation 910 is given is a friend, the electronic device 1000 may determine the emotion information of the user as 'nervousness weight: 0.1, joy weight: 0.9'.

When information about a place where the presentation 910 is given is obtained, the electronic device 1000 may determine the emotion information of the user, considering the place. For example, when the presentation 910 is given at a conference room, the electronic device 1000 may determine the emotion information of the user as 'nervousness weight: 0.4, joy weight: 0.4, afraidness weight: 0.2'. Otherwise, when the presentation 910 is given at an outing, the electronic device 1000 may determine the emotion information of the user as 'nervousness weight: 0.1, joy weight: 0.9'.

According to another embodiment, when the event 900 is a friend's wedding 920, the electronic device 1000 may determine the emotion information of the user as 'nervousness weight: 0.2, joy weight: 0.8' by default. However, when time information of the friend's wedding 920 is obtained, the electronic device 1000 may determine the emotion information of the user, considering the time information of the friend's wedding 920. For example, when the friend's wedding 920 is in the morning, the electronic device 1000 may determine the emotion information of the user as 'nervousness weight: 0.3, joy weight: 0.6, laziness weight: 0.1'. Otherwise, the electronic device 1000 may determine the emotion information of the user as 'nervousness weight: 0.2, joy weight: 0.8' when the friend's wedding 920 is in the afternoon, or determine the emotion information of the user as 'nervousness weight: 0.1, joy weight: 0.9' when the friend's wedding 920 is in the evening.

When information about a place where the friend's wedding 920 is held is obtained, the electronic device 1000 may determine the emotion information of the user, considering the place. For example, when the friend's wedding 920 is held outdoors, the electronic device 1000 may determine the emotion information of the user as 'joy weight: 1'.

According to an embodiment, the electronic device 1000 may learn emotion information of a user for at least one event included in notification information, based on feedback information of the user on the at least one event. The feedback information of the user is information on an emotional state of the user for the at least one event, and may be obtained based on an input of the user. For example, the electronic device 1000 may provide notification information for at least one event through a virtual assistant interface to a user, and obtain feedback information of the user on the at least one event included in the notification information. The electronic device 1000 may identify an emotional state of the user for the at least one event by analyzing the feedback information of the user, and learn emotion information of the user for the at least one event, based on the emotional state of the user. The operation, performed by the electronic device 1000, of learning the emotion information of the user for the at least one event, based on the feedback information of the user will now be described with reference to FIGS. 10 and 11.

Figure 10:
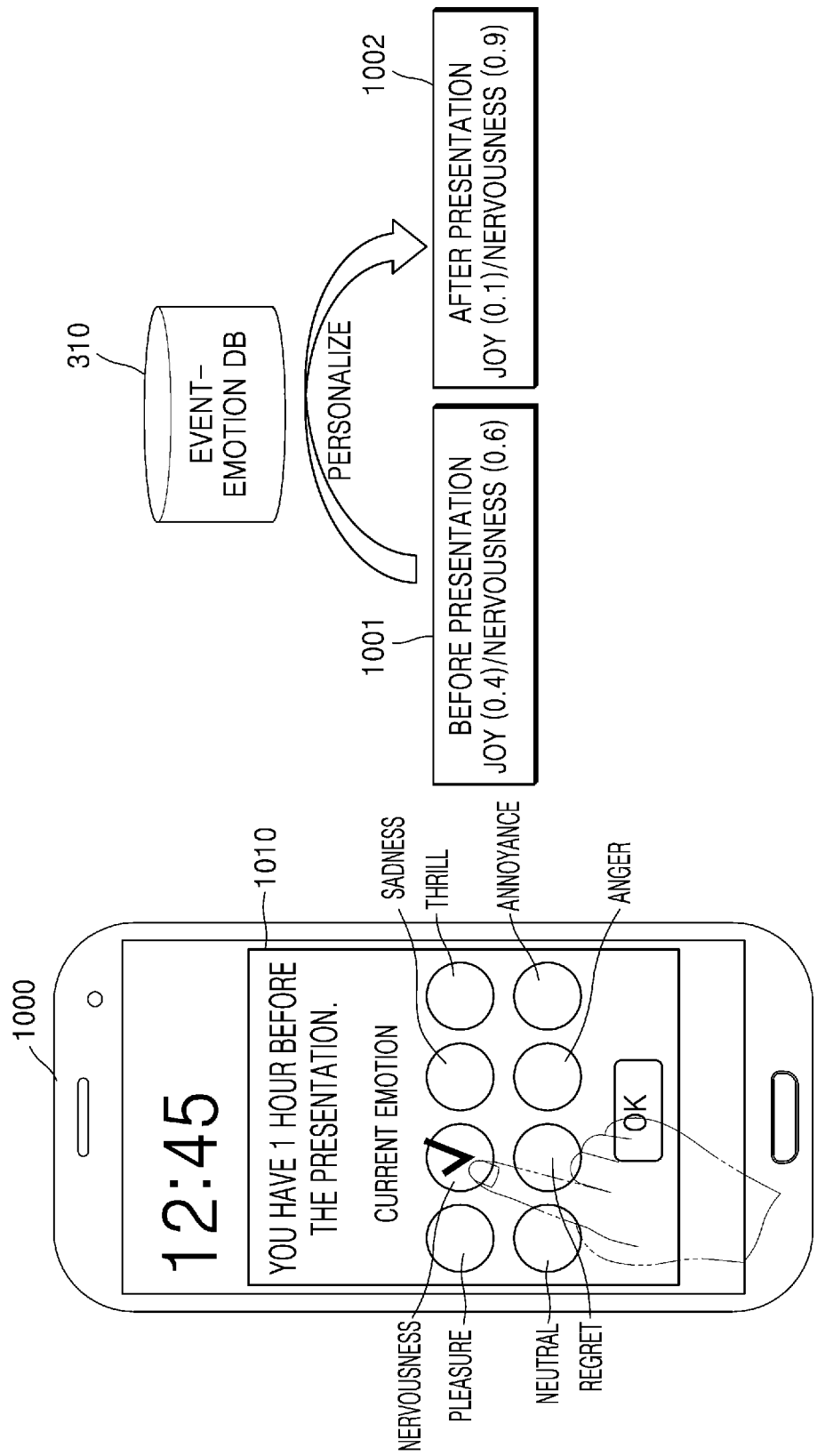
FIGS. 10 and 11 are schematic diagrams for describing an operation of personalizing an event-emotion DB, according to an embodiment.
Figure 11:
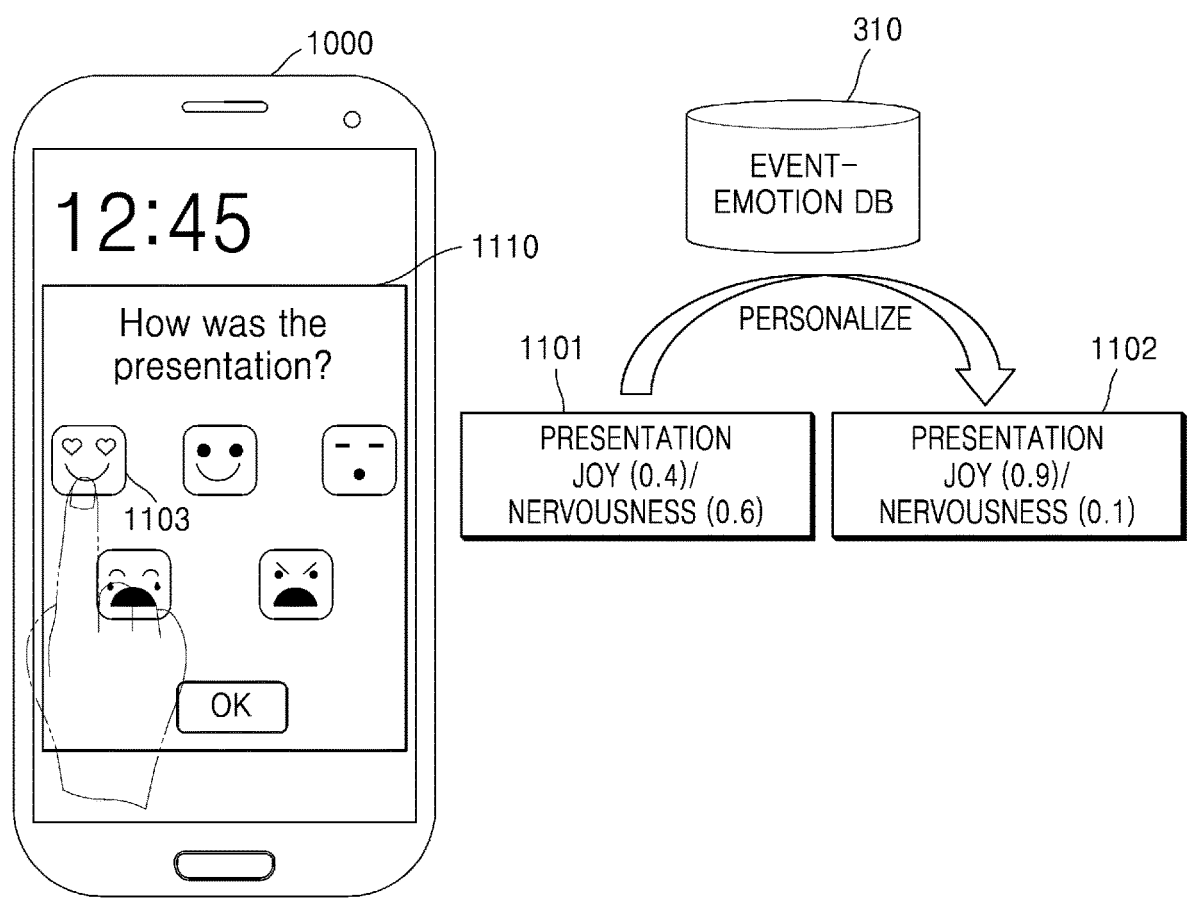

FIGS. 10 and 11 are schematic diagrams for describing an operation of personalizing the event-emotion DB 310, according to an embodiment.

Referring to FIG. 10, before a user event occurs, the electronic device 1000 may provide a notification related to the user event (e.g., You have 1 hour before the presentation) through a notification window 1010 to a user.

In this case, the electronic device 1000 may provide an emotion candidate list and obtain actual emotion information before the user event from the user. For example, the electronic device 1000 may provide the emotion candidate list including pleasure, nervousness, sadness, thrill, neutral, regret, anger, annoyance, etc., and receive a user input for selecting 'nervousness' in the emotion candidate list.

The electronic device 1000 may personalize default emotion information stored in the event-emotion DB 310, based on the actual emotion information input by the user. For example, emotion information 1001 of the user before the presentation, which is stored in the event-emotion DB 310, may be 'joy weight: 0.4, nervousness weight 0.6'. However, because the user selects 'nervousness' in the emotion candidate list displayed on the notification window 1010, the electronic device 1000 may personalize the emotion information of the user for the presentation by increasing the nervousness weight included in the default emotion information. For example, personalized emotion information 1002 for the presentation may be 'joy weight: 0.1, nervousness weight: 0.9'.

Referring to FIG. 11, the electronic device 1000 may obtain feedback of the user on the user event after the user event is finished. For example, the electronic device 1000 may provide a query window 1110 for checking an emotion for the user event. According to an embodiment, the electronic device 1000 may display, on the query window 1110, an emotion candidate list including a plurality of images indicating emotional states. In this case, the electronic device 1000 may receive, from the user, an input for selecting an image 1103 indicating joy in the emotion candidate list.

The electronic device 1000 may personalize default emotion information for the presentation, which is stored in the event-emotion DB 310, based on actual emotion information input by the user. For example, emotion information 1101 of the user for the presentation, which is stored in the event-emotion DB 310, may be 'joy weight: 0.4, nervousness weight 0.6'. However, because the user has selected the image 1103 indicating joy in the emotion candidate list displayed on the query window 1110, the electronic device 1000 may personalize the emotion information of the user for the presentation by increasing the joy weight included in the default emotion information. For example, personalized emotion information 1102 for the presentation may be 'joy weight: 0.9, nervousness weight: 0.1'.

An operation, performed by the electronic device 1000, of monitoring biometric information of a user by using an external device, and modifying default emotion information, based on the biometric information of the user will now be described.

Figure 12:
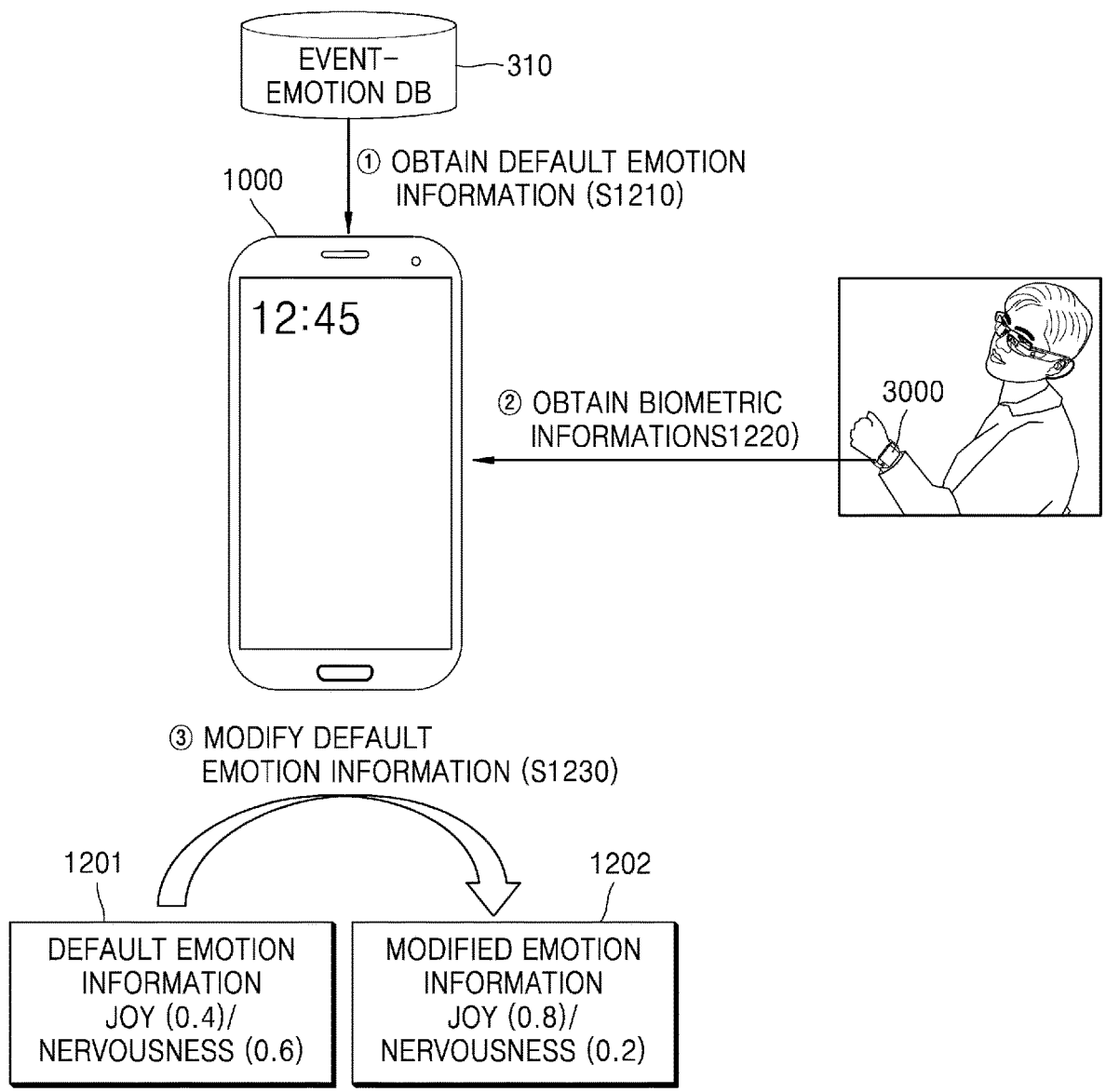
FIG. 12 is a schematic diagram for describing an operation, performed by an electronic device, of modifying default emotion information, based on biometric information, according to an embodiment.

FIG. 12 is a schematic diagram for describing an operation, performed by the electronic device 1000, of modifying default emotion information, based on biometric information, according to an embodiment.

In operation S1210, the electronic device 1000 may obtain default emotion information 1201 related to a user event from the event-emotion DB 310. The default emotion information 1201 may be average emotion information of ordinary people for the user event, or previous emotion information of the user for the user event. For example, the default emotion information 1201 for a presentation, which is stored in the event-emotion DB 310, may be 'joy weight: 0.4, nervousness weight: 0.6'.

In operation S1220, to check actual emotion information of the user, the electronic device 1000 may obtain biometric information of the user from an external device 3000. For example, the electronic device 1000 may receive heart rate information or body temperature change information of the user from a smart watch worn on a wrist of the user. In addition, the electronic device 1000 may receive voice data of the user, which is recorded by the smart watch. The electronic device 1000 may receive the biometric information of the user from the external device 3000 in a predetermined cycle or when a specific event occurs, but is not limited thereto.

According to an embodiment, the electronic device 1000 may obtain actual emotion information of the user, based on the biometric information of the user. For example, the electronic device 1000 may determine that nervousness of the user is increased, when a heart rate of the user is increased and a body temperature of the user is also increased, or determine that nervousness of the user is reduced, when the heart rate of the user is stabilized. In addition, when a result of analyzing the voice data of the user indicates that voice is shaking or words used when nervous (e.g., well . . . and uh . . . ) are used a lot, the electronic device 1000 may determine that nervousness of the user is increased. Otherwise, when the result of analyzing the voice data of the user indicates that the user cheers or laughs a lot, the electronic device 1000 may determine that joy of the user is increased.

According to an embodiment, the electronic device 1000 may obtain the biometric information of the user before, during, and after a user event registered in the event DB 340, but is not limited thereto. In this case, the electronic device 1000 may monitor changes in the emotion of the user as the user event progresses.

In operation S1230, the electronic device 1000 may modify the default emotion information 1201 for the presentation, which is stored in the event-emotion DB 310, based on the biometric information of the user. For example, when the heart rate of the user is stable, the electronic device 1000 may reduce the nervousness weight included in the default emotion information 1201, from '0.6' to '0.2'. Therefore, modified emotion information 1202 may be 'joy weight: 0.8, nervousness weight: 0.2'.

Figure 13:
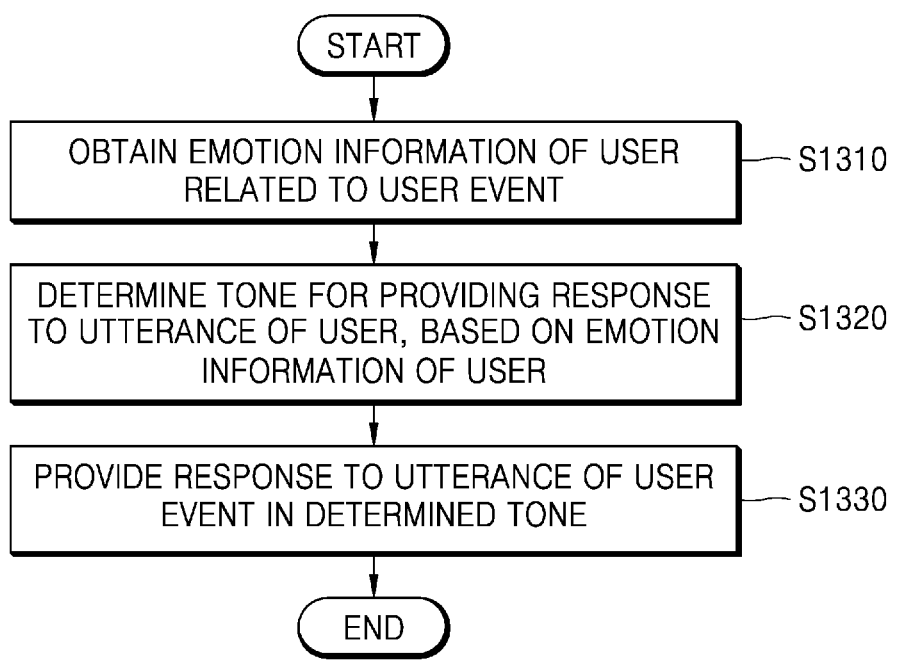
FIG. 13 is a flowchart of a method of determining a tone, based on emotion information of a user, according to an embodiment.

FIG. 13 is a flowchart of a method of determining a tone, based on emotion information of a user, according to an embodiment.

In operation S1310, the electronic device 1000 may obtain emotion information of a user related to a user event.

According to an embodiment, the electronic device 1000 may obtain the emotion information of the user related to the user event at a time when an utterance of the user related to the user event is detected. According to another embodiment, the electronic device 1000 may obtain the emotion information of the user for the user event to proactively provide interaction before an utterance of the user related to the user event.

According to an embodiment, the electronic device 1000 may obtain the emotion information of the user related to the user event by using an AI model. For example, the electronic device 1000 may obtain the emotion information of the user corresponding to a specific user event from the event-emotion DB 310 generated (or refined) by the AI model. The event-emotion DB 310 may store average emotion information of ordinary people for a specific event, or emotion information personalized per user for a specific event, but is not limited thereto.

Operation S1310 may correspond to operation S210 of FIG. 2, and thus a detailed description thereof is not provided herein.

In operation S1320, the electronic device 1000 may determine a tone for providing a response to an utterance of the user, based on the emotion information of the user related to the user event. For example, the electronic device 1000 may determine a speech rate, a pitch average, a pitch range, an intensity, voice quality, pitch changes, and articulation, based on the emotion information of the user related to the user event, but is not limited thereto.

For example, referring to an emotion-tone table 1410 shown in FIG. 14, when the emotion information of the user indicates fear, the electronic device 1000 may determine the speech rate to be 'much faster', determine the pitch average to be 'very much higher', determine the pitch range to be 'much wider', determine the intensity to be 'normal', determine the voice quality to be 'irregular voicing', determine the pitch changes to be 'normal', and determine the articulation to be 'precise'.

Otherwise, when the emotion information of the user indicates anger, the electronic device 1000 may determine the speech rate to be 'slightly faster', determine the pitch average to be 'very much higher', determine the pitch range to be 'much wider', determine the intensity to be 'higher', determine the voice quality to be 'breathy chest tone', determine the pitch changes to be 'abrupt on stressed syllable', and determine the articulation to be 'tense'.

In operation S1330, the electronic device 1000 may provide a response to an utterance of the user related to the user event in the determined tone. Therefore, according to an embodiment, the electronic device 1000 may efficiently provide emotional interaction to the user by varying the tone of voice for providing the response, based on the emotion information of the user for the user event.

Figure 15:
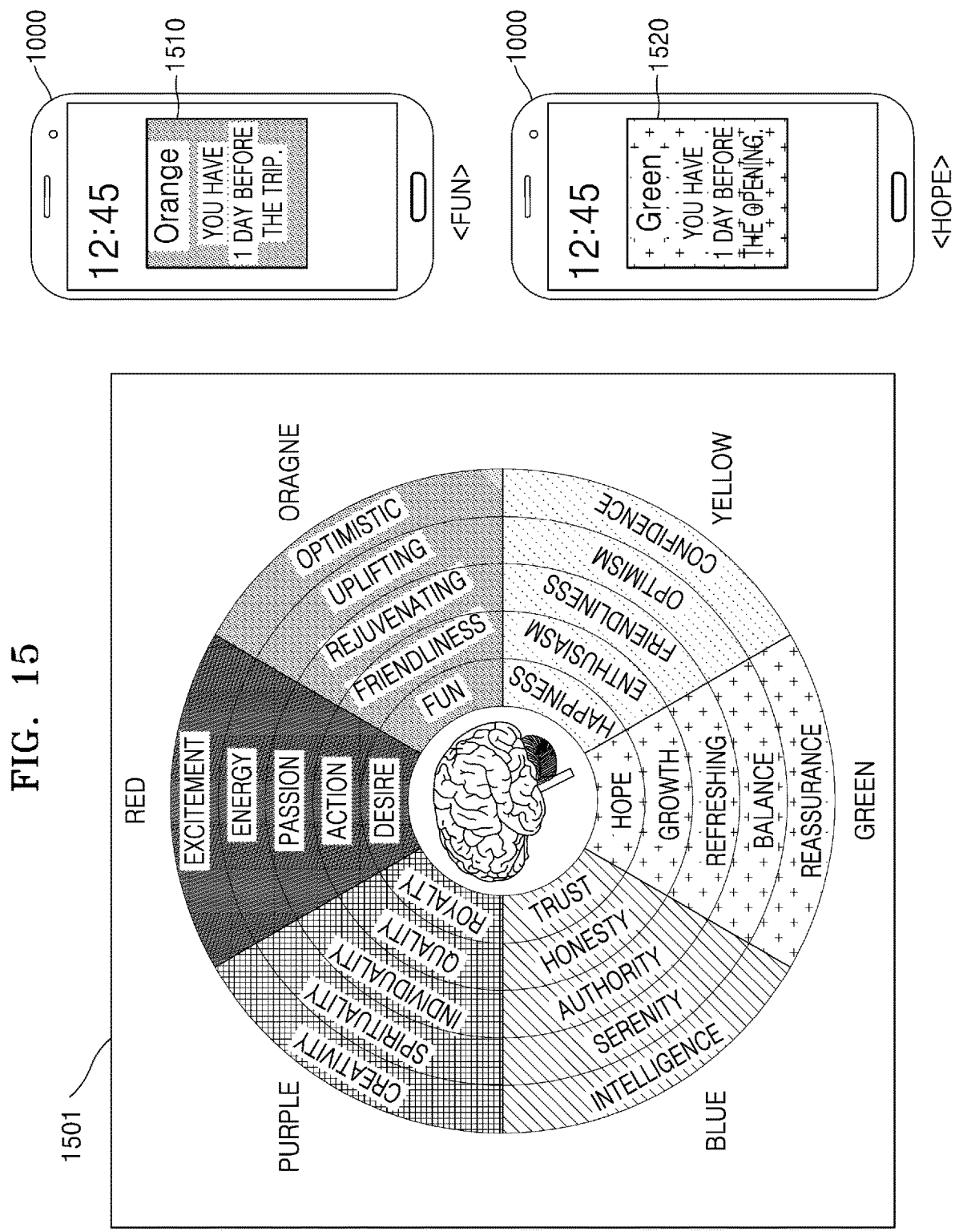
FIG. 15 is a schematic diagram for describing an operation, performed by an electronic device, of providing a notification by using a color corresponding to emotion information of a user, according to an embodiment.

FIG. 15 is a schematic diagram for describing an operation, performed by the electronic device 1000, of providing a notification by using a color corresponding to emotion information of a user, according to an embodiment.

According to an embodiment, the electronic device 1000 may determine a color corresponding to emotion information of a user. For example, referring to an emotion-color table 1501, the electronic device 1000 may determine red for emotions such as excitement, energy, passion, action, and desire, or determine orange for emotions such as optimistic, uplifting, rejuvenating, friendliness, and fun, but is not limited thereto.

According to an embodiment, the electronic device 1000 may adjust brightness or saturation. For example, a low brightness or saturation level may be determined for an emotion close to the center of the emotion-color table 1501.

According to an embodiment, the electronic device 1000 may provide a notification by using the determined color. For example, when a user event is a 'trip' and an emotional state of the user indicates 'fun', the electronic device 1000 may display, on an orange notification window 1510, text indicating 1 day before the trip (e.g., You have 1 day before the trip). Otherwise, when the user event is an 'opening' and the emotional state of the user indicates 'hope', the electronic device 1000 may display, on a green notification window 1520, text indicating 1 day before the opening (e.g., You have 1 day before the opening).

Figure 16:
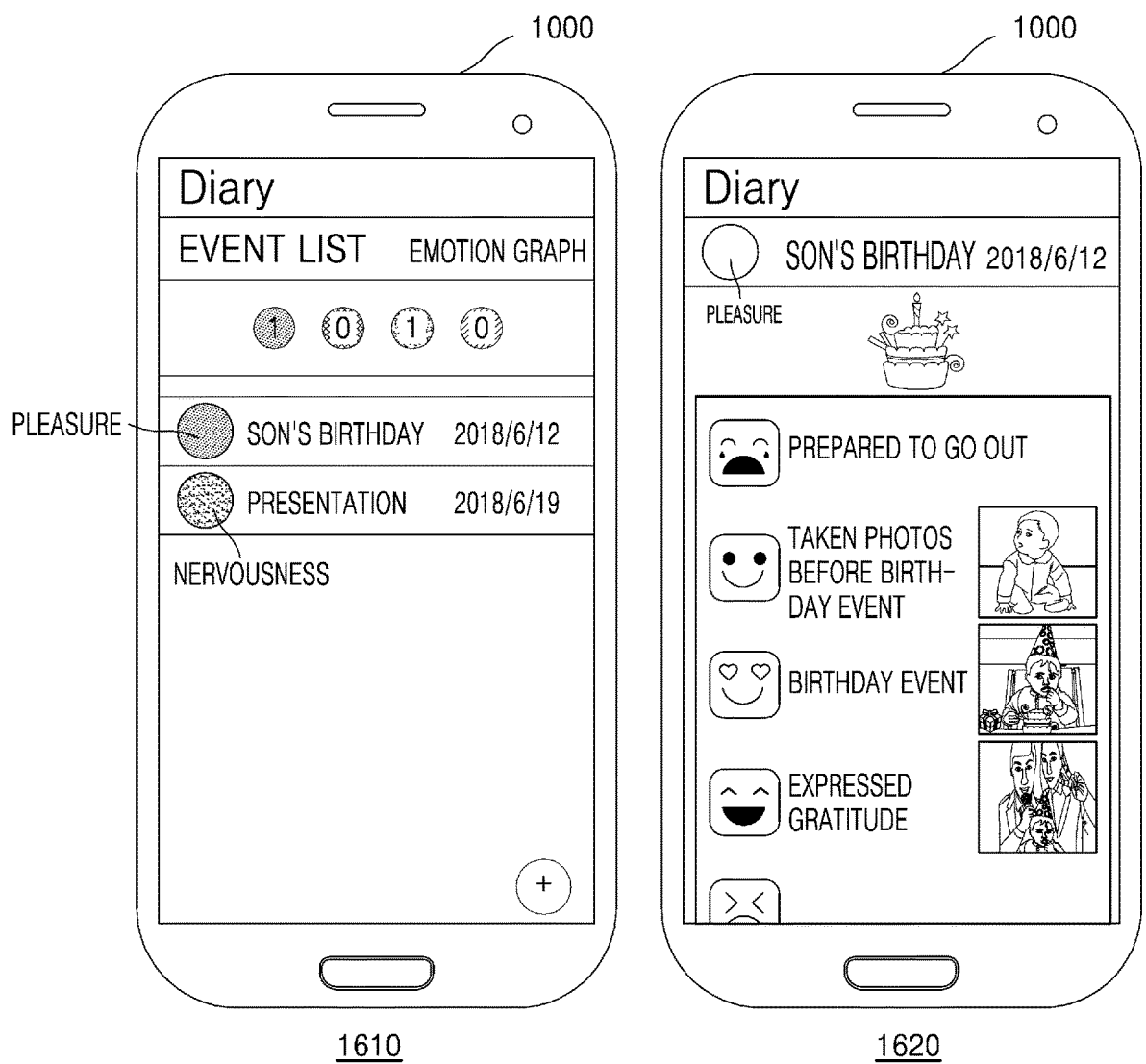
FIGS. 16 and 17 are schematic diagrams for describing an operation, performed by an electronic device, of providing a diary interface, according to an embodiment.
Figure 17:
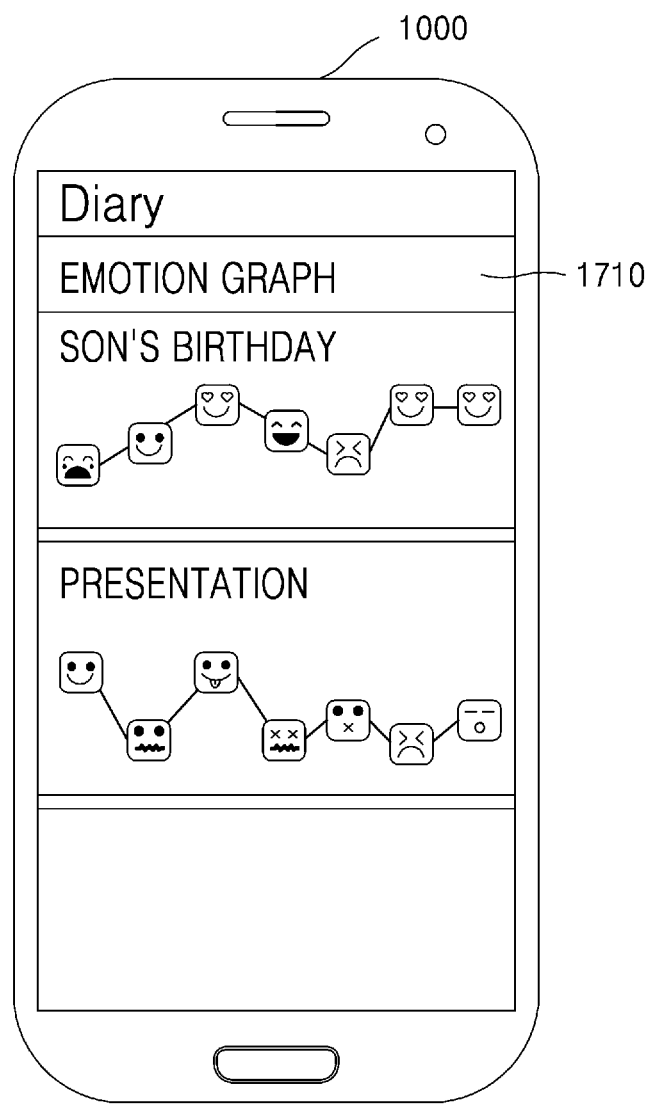

FIGS. 16 and 17 are schematic diagrams for describing an operation, performed by the electronic device 1000, of providing a diary interface, according to an embodiment.

Referring to a first screen 1610 of FIG. 16, the electronic device 1000 may display a list of user events on a diary interface. In this case, the electronic device 1000 may display representative emotions of a user for the user events in front of event names. For example, when a representative emotion of the user for son's birthday is 'pleasure', the electronic device 1000 may display 'pleasure' next to the son's birthday. In addition, when a representative emotion of the user for a presentation is 'nervousness', the electronic device 1000 may display 'nervousness' next to the presentation. According to an embodiment, the representative emotions may be displayed in the form of emoticons.

According to an embodiment, the electronic device 1000 may sort the list of the user events in chronological order or by emotion, but is not limited thereto.

Referring to a second screen 1620 of FIG. 16, when the user selects the son's birthday in the list of the user events, the electronic device 1000 may specifically provide emotion information related to the son's birthday to the user. For example, the electronic device 1000 may provide changes in the emotion of the user from before to after the user event, in the form of a simple diary. In this case, the electronic device 1000 may display the changes in the emotion of the user in the form of simple emoticons. In addition, when the electronic device 1000 includes photographic images related to the user event, the electronic device 1000 may add the photographic images to the diary viewed to the user. The electronic device 1000 may receive, from the user, an additional comment related to the user event. For example, the user may add an interesting episode or a photographic image related to the son's birthday.

Referring to FIG. 17, the electronic device 1000 may provide an emotion graph 1710 corresponding to each user event on a diary interface. An emotion graph may be a graph showing changed in the emotion of the user from before to after an event. According to an embodiment, the emotion graph may be a 2-dimensional graph or a 3-dimensional graph, but is not limited thereto.

Figure 18:
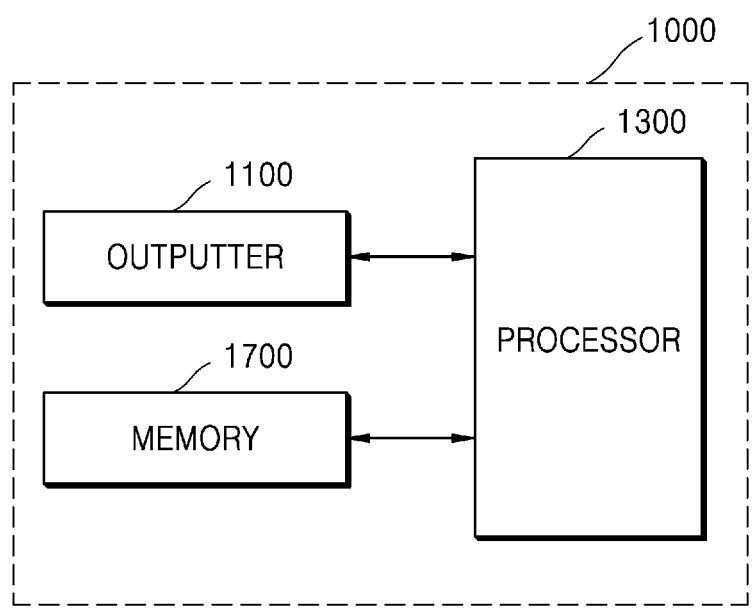
FIGS. 18 and 19 are block diagrams of an electronic device according to an embodiment.
Figure 19:
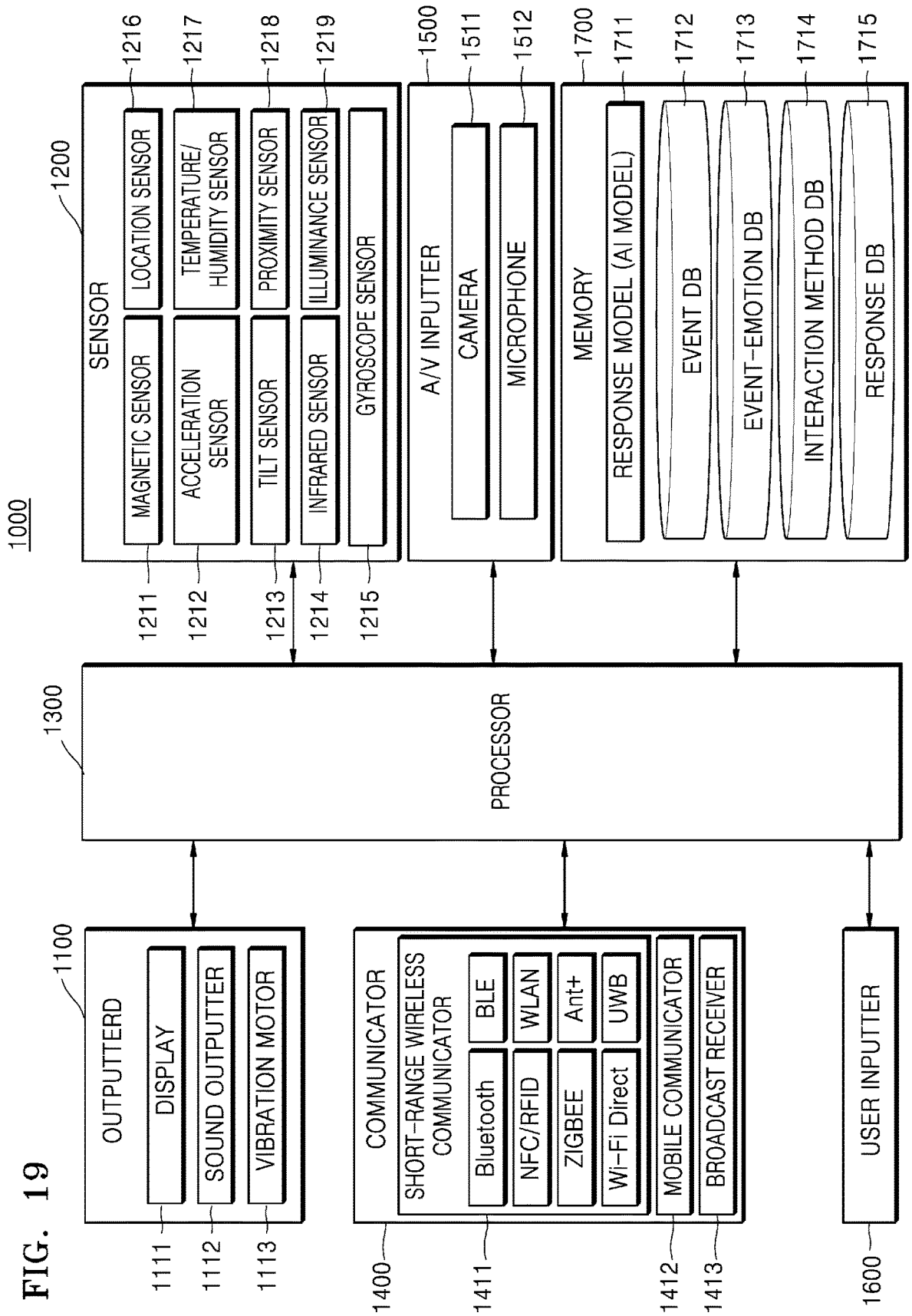

FIGS. 18 and 19 are block diagrams of the electronic device 1000 according to an embodiment.

As illustrated in FIG. 18, the electronic device 1000 according to an embodiment may include an outputter 1100, a processor 1300, and a memory 1700. However, not all of the illustrated elements are essential elements. The electronic device 1000 may include a larger or smaller number of elements compared to the illustrated elements.

For example, as illustrated in FIG. 19, the electronic device 1000 according to an embodiment may include a sensor 1200, a communicator 1400, an audio/video (A/V) inputter 1500, and a user inputter 1600 in addition to the outputter 1100, the processor 1300, and the memory 1700.

The above-mentioned elements will now be described one by one.

The outputter 1100 is used to output an audio signal, a video signal, or a vibration signal, and may include, for example, a display 1111, a sound outputter 1112, and a vibration motor 1113.

The sound outputter 1112 outputs audio data received from the communicator 1400 or stored in the memory 1700. In addition, the sound outputter 1112 outputs a sound signal related to a function performed by the electronic device 1000 (e.g., incoming call sound, message received sound, or notification sound). The sound outputter 1112 may include, for example, a speaker or a buzzer. According to an embodiment, the sound outputter 1112 may provide a voice response to an utterance of a user related to a user event.

The vibration motor 1113 may output a vibration signal. For example, the vibration motor 1113 may output a vibration signal corresponding to output of audio or video data (e.g., incoming call sound or message received sound). The vibration motor 1113 may output a vibration signal when touch on a touchscreen is input.

The outputter 1100 may provide an interactive interface. The interactive interface may be provided in the form of a message or chat window or in the form of a voice input/output interface, but is not limited thereto.

The outputter 1100 may provide a diary interface including emotion information of the user related to user events. For example, the diary interface may list previous emotional states and episodes related to every event registered in a reminder application or a calendar application. In this case, the previous emotional states may be displayed as emoticons or a simple graph.

The sensor 1200 may include at least one of a magnetic sensor 1211, an acceleration sensor 1212, a tilt sensor 1213, an infrared sensor 1214, a gyroscope sensor 1215, a location sensor (e.g., a global positioning system (GPS) sensor) 1216, a temperature/humidity sensor 1217, a proximity sensor 1218, and an illuminance sensor 1219, but is not limited thereto. Functions of the sensors may be intuitively inferred from their names by one of ordinary skill in the art, and thus a detailed description thereof is not provided herein.

The processor 1300 generally controls overall operations of the electronic device 1000. For example, the processor 1300 may control all of the outputter 1100, the sensor 1200, the communicator 1400, the A/V inputter 1500, the user inputter 1600, and the memory 1700 by executing programs stored in the memory 1700.

According to an embodiment, the processor 1300 may include an AI processor for generating a learning network model, but is not limited thereto. According to an embodiment, the AI processor may be implemented as a chip separate from the processor 1300.

The processor 1300 may query the user about schedule information by using a virtual assistant interface, and receive a response including information about at least one event, from the user. The processor 1300 may identify an emotional state of the user for the at least one event by analyzing the response to the query, and learn emotion information of the user for the at least one event, based on the emotional state of the user. The processor 1300 may determine an interaction type for the at least one event, based on the emotion information of the user, and provide notification information for the at least one event though the virtual assistant interface, based on the interaction type.

The processor 1300 may obtain the emotion information of the user related to the user event registered in the electronic device 1000. According to an embodiment, the electronic device 1000 may obtain the emotion information of the user related to the user event from an AI model trained based on at least one of emotion information analyzed by an expert and previous emotion information of the user. According to an embodiment, the processor 1300 may determine a progress stage of the user event by comparing a current time to a scheduled time of the user event, and obtain the emotion information of the user related to the user event, based on the progress stage of the user event.

The processor 1300 may extract information related to the user event from voice data of an utterance of the user, and register the user event as a new event in the electronic device 1000 by using the extracted information. The processor 1300 may extract the emotion information of the user from the voice data of the user.

The processor 1300 may obtain default emotion information related to the user event from a table in which events are mapped to emotion information, obtain biometric information of the user by using the sensor 1200 or an external device, and obtain the emotion information of the user related to the user event by modifying the default emotion information, based on the biometric information of the user. The processor 1300 may identify the emotional state of the user for the at least one event, based on information obtained by analyzing the voice data of the utterance of the user, and learn the emotion information of the user for the at least one event by modifying the default emotion information, based on the emotional state of the user.

The processor 1300 may obtain feedback on the user event through the user inputter 1600 from the user after the user event is finished, and refine the table in which events are mapped to emotion information, based on the obtained feedback. For example, the processor 1300 may provide notification information for at least one event through a virtual assistant interface to a user, and obtain feedback information of the user on the at least one event included in the notification information. The processor 1300 may identify an emotional state of the user for the at least one event by analyzing the feedback information of the user, and learn emotion information of the user for the at least one event, based on the emotional state of the user.

The processor 1300 may obtain the emotion information of the user, considering at least one of a person related to the user event, a scheduled time of the user event, and a place related to the user event.

The processor 1300 may determine an interaction type corresponding to the user event, based on the emotion information of the user. According to an embodiment, the processor 1300 may determine a response to the utterance of the user or a tone for providing the notification information, based on the emotion information of the user related to the user event.

The processor 1300 may control the outputter 1100 to provide the response to the utterance of the user related to the user event though the interactive interface, based on the determined interaction type. For example, the processor 1300 may select a color corresponding to the emotion information of the user, and display the response to the utterance of the user or the notification information related to the user event by using the selected color.

The processor 1300 may provide the response by applying an expression style preferred by the user. The processor 1300 may determine a notification providing method related to the user event, considering a situation of the user, and provide a notification related to the user event, based on the determined notification providing method. For example, the processor 1300 may provide only a visual notification when the user is in an important meeting, and then provide a vibration or sound notification after the meeting is finished.

The communicator 1400 may include one or more elements for enabling communication between the electronic device 1000 and a wearable device or between the electronic device 1000 and a server (not shown). For example, the communicator 1400 may include a short-range wireless communicator 1411, a mobile communicator 1412, and a broadcast receiver 1413.

The short-range wireless communicator 1411 may include, for example, a Bluetooth communicator, a Bluetooth low energy (BLE) communicator, a near field communicator (NFC), a wireless local area network (WLAN) (or Wi-Fi) communicator, a Zigbee communicator, an infrared data association (IrDA) communicator, a Wi-Fi direct (WFD) communicator, an ultra-wideband (UWB) communicator, and an Ant+communicator, but is not limited thereto.

The mobile communicator 1412 transmits and receives radio signals to and from at least one of a base station, an external terminal device, and a server in a mobile communication network. Herein, the radio signals may include various types of data based on transmission and reception of voice call signals, video call signals, or text/multimedia messages.

The broadcast receiver 1413 receives broadcast signals and/or broadcast-related information through broadcast channels from outside. The broadcast channels may include satellite channels and terrestrial channels. According to another embodiment, the electronic device 1000 may not include the broadcast receiver 1413.

According to an embodiment, the communicator 1400 may obtain biometric information of a user of the external device. For example, the communicator 1400 may collect heart rate information, breathing information, and body temperature information of the user from the wearable device connected to the electronic device 1000.

The A/V inputter 1500 is used to input audio signals or video signals, and may include a camera 1511 and a microphone 1512. The camera 1511 may obtain image frames such as still images or moving images through an image sensor in a video call mode or an image capturing mode. The images captured through the image sensor may be processed through the processor 1300 or a separate image processor (not shown). The image frames processed by the camera 1511 may be stored in the memory 1700 or be transmitted outside through the communicator 1400. According to an embodiment, the camera 1511 may include at least one of a telescopic camera, a wide-angle camera, and a general camera, but is not limited thereto.

The microphone 1512 receives an external sound signal and processes the same into electrical voice data. For example, the microphone 1512 may receive a sound signal from the external device or the user. The microphone 1512 may use various noise cancellation algorithms to cancel noise occurring when the external sound signal is received.

The user inputter 1600 refers to a means used by the user to input data for controlling the electronic device 1000. For example, the user inputter 1600 may include a keypad, a dome switch, a touchpad (e.g., a capacitive overlay, resistive overlay, infrared beam, surface acoustic wave, integral strain gauge, or piezoelectric touchpad), a jog wheel, or a jog switch, but is not limited thereto.

The memory 1700 may store programs for processing and control operations of the processor 1300, and store input/output data (e.g., voice data, photographic images, metadata, personalized training data, and biometric information of the user).

The memory 1700 may include at least one type of a storage medium from among flash memory, a hard disk, a multimedia card micro, a memory card (e.g., a secure digital (SD) or extreme digital (XD) card), random access memory (RAM), static RAM (SRAM), read-only memory (ROM), electrically erasable programmable ROM (EEPROM), programmable ROM (PROM), magnetic memory, a magnetic disc, and an optical disc.

The programs stored in the memory 1700 may be categorized into a plurality of modules, e.g., a response model 1711, based on functions thereof. The response model 1711 corresponds to the event-emotion-based response model 300 of FIG. 3, and thus a detailed description thereof is not provided herein.

The memory 1700 may include an event DB 1712. The event DB 1712 may correspond to the event DB 340 of FIG. 5. In addition, the memory 1700 may store an event-emotion DB 1713, an interaction method DB 1714, and a response DB 1715 generated by the response model 1711. The event-emotion DB 1713, the interaction method DB 1714, and the response DB 1715 respectively correspond to the event-emotion DB 310, the interaction method DB 320, and the response DB 330 of FIG. 3, and thus a detailed description thereof is not provided herein.

The electronic device 1000 may cooperate with a server (not shown) to provide a response message to the user.

In this case, the server (not shown) may generate an event-emotion-based response model by learning criteria for determining a response situation (e.g., a situation for providing an event-emotion-based response), and the electronic device 1000 may determine a response situation by using the event-emotion-based response model generated based on the learning result of the server (not shown). In this case, the electronic device 1000 may provide data for the event-emotion-based response model to the server (not shown), and the server (not shown) may determine a response situation and provide the determined response situation to the electronic device 1000. Alternatively, the electronic device 1000 may receive data for the event-emotion-based response model from the server (not shown), and determine a response situation by using the received event-emotion-based response model.

A method according to an embodiment may be implemented in the form of program commands that can be executed through various computer means, and be recorded on a computer-readable recording medium. The computer-readable recording medium may include program commands, data files, data structures, or combinations thereof. The program commands recorded on the computer-readable recording medium may be those specially designed and constructed for the purposes of the disclosure, or those well-known and available to one of ordinary skill in the art of computer software. Examples of the computer-readable recording medium include magnetic media (e.g., hard disks, floppy disks, and magnetic tapes), optical media (e.g., CD-ROMs or DVDs), magneto-optical media (e.g., floptical disks), and hardware devices (e.g., ROMs, RAMs, and flash memories) that are specially configured to store and execute program commands. Examples of the program commands include both machine code produced by a compiler, and high-level language code that may be executed by the computer using an interpreter.

Some embodiments may be implemented in the form of a computer-readable recording medium including instructions executable by a computer, e.g., a program module executed by a computer. The computer-readable recording medium may be an arbitrary available medium accessible by a computer, and examples thereof include all of volatile, non-volatile, detachable, and non-detachable media. The computer-readable recording medium may include a computer storage medium and a communication medium. Examples of the computer storage medium include all of volatile, non-volatile, detachable, and non-detachable media implemented using an arbitrary method or technology for storing information such as computer-readable instructions, data structures, program modules, or other data. Examples of the communication medium typically include computer-readable instructions, data structures, program modules, other data of modulated data signals such as carrier waves, or other transmission mechanisms, and include arbitrary information transmission media. Some embodiments may be implemented as a computer program including instructions executable by a computer, e.g., a computer program executed by a computer, or a computer program product.

While embodiments of the disclosure have been described in detail, it will be understood by one of ordinary skill in the art that various changes in form and details may be made therein without departing from the scope as defined by the following claims.

The invention claimed is:

1. A method, performed by an electronic device, of providing a virtual assistant interface, the method comprising:

querying a user about a schedule by using the virtual assistant interface;

receiving a response to the query from the user, the response comprising information about at least one event related to the schedule, wherein the receiving of the response to the query comprises receiving voice data of an utterance of the user as the response to the query;

identifying, from the voice data, the at least one event related to the schedule and an emotional state of the user for the at least one event related to the schedule by analyzing the response to the query;

learning emotion information of the user for the at least one event related to the schedule, based on the emotional state of the user for the at least one event related to the schedule;

determining an interaction type for the at least one event related to the schedule, based on the emotion information of the user for the at least one event related to the schedule; and providing notification information for the at least one event related to the schedule through the virtual assistant interface, based on the interaction type.

2. The method of claim 1, wherein the receiving of the response to the query comprises:

extracting information related to the at least one event from the voice data; and registering the at least one event as a new event in the electronic device by using the extracted information.

3. The method of claim 1, wherein the learning of the emotion information of the user comprises:

obtaining default emotion information related to the at least one event from information for mapping events to emotion information; and learning the emotion information of the user for the at least one event by modifying the default emotion information, based on the emotional state of the user for the at least one event related to the schedule.

4. The method of claim 1, wherein the learning of the emotion information of the user comprises:

determining a progress stage of the at least one event based on a relationship between a current time and a scheduled time of the at least one event; and refining the emotion information of the user for the at least one event, based on the progress stage of the at least one event.

5. The method of claim 1, wherein the learning of the emotion information of the user comprises:

obtaining feedback information on the at least one event from the user after the at least one event is finished; and refining the emotion information of the user for the at least one event, based on the obtained feedback information.

6. The method of claim 1, wherein the learning of the emotion information of the user comprises learning the emotion information of the user by using information related to at least one of a person related to the at least one event, a scheduled time of the at least one event, or a place related to the at least one event.

7. The method of claim 1, wherein the determining of the interaction type comprises determining a tone for providing the notification information for the at least one event, based on the emotion information of the user.

8. The method of claim 1, wherein the providing of the notification information comprises:

selecting a color corresponding to the emotion information of the user; and displaying the notification information for the at least one event by using the selected color.

9. The method of claim 1, further comprising providing a response to an utterance of the user related to the at least one event, based on the determined interaction type.

10. The method of claim 1, wherein the providing of the notification information for the at least one event comprises:

determining a notification providing method related to the at least one event, based on a situation of the user; and providing the notification information for the at least one event, based on the determined notification providing method.

11. The method of claim 1, further comprising providing a diary interface comprising the emotion information of the user related to the at least one event.

12. An electronic device comprising:

an output interface configured to provide a virtual assistant interface; and at least one processor configured to:

query a user about a schedule by using the virtual assistant interface;

receive a response to the query from the user, the response comprising information about at least one event related to the schedule, wherein the receiving of the response to the query comprises receiving voice data of an utterance of the user as the response to the query;

identify, from the voice data, the at least one event related to the schedule and an emotional state of the user for the at least one event related to the schedule by analyzing the response to the query;

learn emotion information of the user for the at least one event related to the schedule, based on the emotional state of the user for the at least one event related to the schedule;

determine an interaction type for the at least one event related to the schedule, based on the emotion information of the user for the at least one event related to the schedule; and provide notification information for the at least one event related to the schedule through the virtual assistant interface, based on the interaction type.

13. The electronic device of claim 12, wherein the at least one processor is further configured to:

extract information related to the at least one event from the voice data; and register the at least one event as a new event in the electronic device, using the extracted information.

14. The electronic device of claim 12, wherein the at least one processor is further configured to:

obtain default emotion information related to the at least one event from information for mapping events to emotion information; and learn the emotion information of the user for the at least one event by modifying the default emotion information, based on the emotional state of the user for the at least one event related to the schedule.

15. A non-transitory computer-readable recording medium having recorded thereon a program which, when executed, causes an electronic device to perform operations comprising:

querying a user about a schedule by using a virtual assistant interface;

receiving a response to the query from the user, the response comprising information about at least one event related to the schedule; wherein the receiving of the response to the query comprises receiving voice data of an utterance of the user as the response to the query, identifying, from the voice data, the at least one event related to the schedule and an emotional state of the user for the at least one event related to the schedule by analyzing the response to the query learning emotion information of the user for the at least one event related to the schedule, based on the emotional state of the user for the at least one event related to the schedule;

determining an interaction type for the at least one event related to the schedule, based on the emotion information of the user for the at least one event related to the schedule; and providing notification information for the at least one event related to the schedule through the virtual assistant interface, based on the interaction type.

16. The method of claim 1, wherein the emotional information comprises information of an emotional state comprising two or more emotions.

* * * * *